(12) United States Patent
Selve

(10) Patent No.: US 7,701,825 B2
(45) Date of Patent: Apr. 20, 2010

(54) APPARATUS FOR AND A METHOD OF AUTHENTICATING RECORDING MEDIA

(75) Inventor: Philippe Marcel Henri Selve, Wokingham (GB)

(73) Assignee: Macrovision Corporation, Santa Clara, CA (US)

(*) Notice: Subject to any disclaimer, the term of this patent is extended or adjusted under 35 U.S.C. 154(b) by 902 days.

(21) Appl. No.: 11/155,988

(22) Filed: Jun. 17, 2005

(65) Prior Publication Data

US 2006/0285689 A1 Dec. 21, 2006

(51) Int. Cl.
*G11B 7/004* (2006.01)
(52) U.S. Cl. .................... 369/53.21; 369/47.21
(58) Field of Classification Search ............. 369/47.21, 369/53.21, 44.32, 44.33; 713/176; 380/229
See application file for complete search history.

(56) References Cited

U.S. PATENT DOCUMENTS

| | | | |
|---|---|---|---|
| 4,603,413 A | 7/1986 | Sinjou et al. | |
| 5,659,613 A | 8/1997 | Copeland et al. | |
| 5,699,434 A * | 12/1997 | Hogan | 705/57 |
| 5,703,858 A | 12/1997 | Mitchell et al. | |
| 5,748,119 A | 5/1998 | Ko | |
| 5,787,068 A | 7/1998 | Arps | |
| 5,828,754 A | 10/1998 | Hogan | |
| 5,832,088 A | 11/1998 | Nakajima et al. | |
| 5,859,601 A | 1/1999 | Moon et al. | |
| 5,898,394 A | 4/1999 | Kobayashi et al. | |
| 6,028,936 A | 2/2000 | Hillis | |
| 6,076,165 A | 6/2000 | Manenza | |
| 6,185,687 B1 | 2/2001 | Sako et al. | |
| 6,278,386 B1 | 8/2001 | Hogan | |

(Continued)

FOREIGN PATENT DOCUMENTS

EP 0 347 934 A2 12/1989

(Continued)

OTHER PUBLICATIONS

Abramovitch, D., "Magnetic and Optical Disk Control : Parallels and Contrasts", tutorial given at the 2001 American Controls Conference, Jun. 25, 2001.

(Continued)

*Primary Examiner*—Wayne R Young
*Assistant Examiner*—Thomas D Alunkal
(74) *Attorney, Agent, or Firm*—Norman R. Klivans

(57) ABSTRACT

A digital recording medium such as an optical disc is recorded using an encoding process this is modified to cause a peak or rapid change in the digital sum value in the encoded data for part of the recording data. This provides the corresponding part of the recorded medium with a modified DC characteristic that affects an operational characteristic of the recording medium. This modified DC characteristic will not be present in unauthorized copies of the recording medium because the normal encoding process will encode the recording data so as to minimize DC imbalance. Profile data is obtained from operational data acquired during operation of the recording medium. This profile data is compared with expected profile data that is the profile data that would be expected to be obtained if the modified DC characteristic is present. The results of this comparison are used to determine whether or not the recording medium is authentic.

29 Claims, 16 Drawing Sheets

U.S. PATENT DOCUMENTS

| | | | |
|---|---|---|---|
| 6,317,397 | B1 | 11/2001 | Deguchi et al. |
| 6,353,890 | B1 | 3/2002 | Newman |
| 6,421,750 | B1 | 7/2002 | Gunther et al. |
| 6,496,541 | B1 | 12/2002 | Kahlman et al. |
| 6,694,023 | B1 | 2/2004 | Kim |
| 6,700,989 | B1 | 3/2004 | Itoh et al. |
| 6,765,739 | B2 * | 7/2004 | Hogan et al. ............... 360/60 |
| 6,782,190 | B1 | 8/2004 | Morito |
| 6,839,312 | B2 | 1/2005 | Heylen et al. |
| 7,030,788 | B2 | 4/2006 | Aida et al. |
| 2001/0011237 | A1 | 8/2001 | Tanaka et al. |
| 2002/0076046 | A1 * | 6/2002 | Heylen ..................... 380/203 |
| 2002/0080706 | A1 * | 6/2002 | Fujimiya ............... 369/59.25 |
| 2002/0159355 | A1 | 10/2002 | Heylen et al. |
| 2003/0021208 | A1 | 1/2003 | Ogura |
| 2003/0227398 | A1 * | 12/2003 | Chen et al. ................. 341/59 |
| 2004/0027940 | A1 | 2/2004 | Minaminto et al. |
| 2004/0037201 | A1 | 2/2004 | Sako et al. |
| 2004/0062168 | A1 | 4/2004 | Kobari et al. |
| 2004/0062169 | A1 | 4/2004 | Coene et al. |
| 2004/0098656 | A1 | 5/2004 | Ohno et al. |
| 2004/0151105 | A1 | 8/2004 | Aida et al. |
| 2004/0165511 | A1 * | 8/2004 | Sako et al. ............. 369/59.24 |
| 2004/0202082 | A1 * | 10/2004 | Sako et al. ............. 369/59.24 |
| 2004/0207545 | A1 | 10/2004 | Kayanuma et al. |
| 2004/0234249 | A1 | 11/2004 | Uno et al. |
| 2005/0015616 | A1 * | 1/2005 | Hogan ..................... 713/200 |
| 2005/0044083 | A1 | 2/2005 | Sako |
| 2005/0163315 | A1 | 7/2005 | Jackson et al. |
| 2005/0193313 | A1 | 9/2005 | Heylen et al. |
| 2005/0254382 | A1 * | 11/2005 | Reiter ..................... 369/53.21 |
| 2006/0202869 | A1 | 9/2006 | Aida et al. |

FOREIGN PATENT DOCUMENTS

| | | |
|---|---|---|
| EP | 0 347 934 A3 | 12/1989 |
| EP | 0 347 934 B1 | 12/1989 |
| EP | 0791923 A2 | 8/1997 |
| EP | 0 854 482 A1 | 7/1998 |
| EP | 0 854 482 B1 | 7/1998 |
| EP | 0 918 325 B1 | 5/1999 |
| EP | 0918326 A1 | 5/1999 |
| EP | 1 011 103 A1 | 6/2000 |
| EP | 1 521 262 A1 | 4/2003 |
| EP | 1 355 306 A1 | 10/2003 |
| EP | 1 396 856 A1 | 3/2004 |
| EP | 1396857 A1 | 3/2004 |
| EP | 1 418 584 A1 | 5/2004 |
| EP | 1 494 235 A1 | 1/2005 |
| EP | 1 505 598 A1 | 2/2005 |
| GB | 2369718 B | 5/2002 |
| GB | 2938671 A | 8/2004 |
| JP | 2002-175662 A | 6/2002 |
| JP | 2003-303468 A | 10/2003 |
| WO | WO-98/02885 A1 | 1/1998 |
| WO | WO-98/54713 A1 | 12/1998 |
| WO | WO-98/57413 A1 | 12/1998 |
| WO | WO-00/74053 A1 | 12/2000 |
| WO | WO 0211136 A1 | 2/2002 |
| WO | WO-03/085668 A1 | 10/2003 |
| WO | WO 2004/066294 A1 | 8/2004 |
| WO | WO-2004/075185 A1 | 9/2004 |
| WO | WO 2004/075186 A2 | 9/2004 |
| WO | WO 2005/020068 A2 | 3/2005 |

OTHER PUBLICATIONS

Immink, K.A.S., "EFMPlus : The Coding Format of the MultiMedia Compact Disc", IEEE Trans. Consumer Electric vol. CE-41, Aug. 1995, pp. 491-497.

Ogawa, H. et al., "EFM—The Modulation Method for the Compact Disc Digital Audio System", Collected papers from the AES Premier Conference : Digital Audio, Rye, New York, May 1982, pp. 117-124.

Macrovision Europe Ltd, "3.3.1 Recording frame modulation", DVD Specifications for Read Only Disc / Part 1: Physical Specifications, Version 1.01, 1996-1997.

Macrovision Europe Ltd, "3.3.2 DC component suppression Control (DCC)", DVD Specifications for Read Only Disc / Part 1: Physical Specifications, Version 1.01, 1996-1997.

Macrovision Europe Ltd, "Compact Disc Read Only Memory System Description", Aug. 1995, pp. 13-16.

Simitopoulos, Dimitrios, et al., Fast Watermarking of MPEG-1/2 Streams Using Compressed-Domain Perceptual Embedding and a Generalized Correlator Detector (2004). In EURASIP Journal on Applied Signal Processing 2004:8, 10881106, 2004 Hindawi Publishing Corporation. [retrieved on Jul. 9, 2007]. Retrieved from the Internet : <URL : http://ivpl.ece.northwestern.edu/Staff/Spapers/jasp_2004.pdf>, pp. 1088-1106.

International Search Report for International application No. PCT/US 06/23347 mailed Sep. 20, 2007, 1 page.

European Search Report mailed on Feb. 25, 2005 for EP Application No. 05 00 0302, two pages.

International Search Report mailed on Oct. 25, 2001, for PCT Application No. PCT/GB01/03364, two pages.

International Search Report mailed on May 24, 2004, for PCT Application No. PCT/GB2004/00643, two pages.

Kalker, T. (1999). "System Issues in Digital Image and Video Watermarking for Copy Protection," Multimedia Computing and Systems 1999 IEEE International Conference, Florence, Italy, Jun. 7-11, 1999, Los Alamitos, CA USA IEEE Comput. So., US 6/799, pp. 562-567.

Menezes, A.J. et al. (1997). "Handbook of Applied Cryptography," CRC Press LLC, Boca Raton, FL, pp. 20-23.

Schouhamer Immink, K.A. (Aug. 1995). "EFMPlus: The Coding Format of the Multimedia Compact Disc," *IEEE Transactions on Consumer Electronics, IEEE, Inc.* New York, US, 41(3):491-497.

Final Office Action mailed on Jan. 7, 2008, for U.S. Appl. No. 10/505,087, filed on Aug. 13, 2004, eight pages.

Final Office Action mailed Jan. 6, 2009, for U.S. Appl. No. 10/505,087, filed Aug. 13, 2004, nine pages.

Non-Final Office Action mailed Jul. 30, 2007, for U.S. Appl. No. 10/505,087, filed Aug. 13, 2004, ten pages.

Non-Final Office Action mailed May 19, 2008, for U.S. Appl. No. 10/505,087, filed Aug. 13, 2004, nine pages.

* cited by examiner 0 0 0 0 0 0 1 1 1 1 1 1 0 0 0 0 0 0 0 0
DATA
FIG.6a
-1 -1 -1 -1 -1 -1 1 1 1 1 1 1 -1 -1 -1 -1 - -1 -1 -1
DSV
FIG.6b
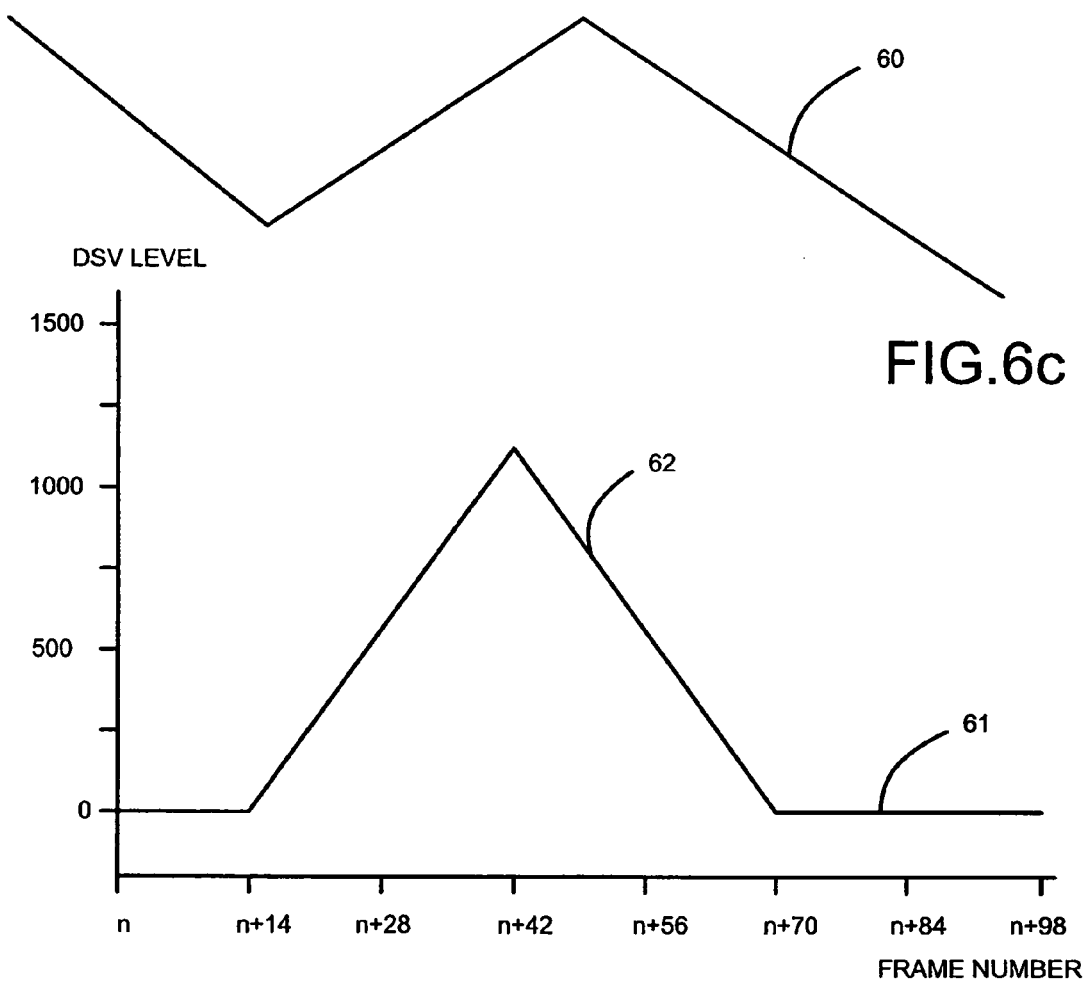
FIG.6c
FIG.7
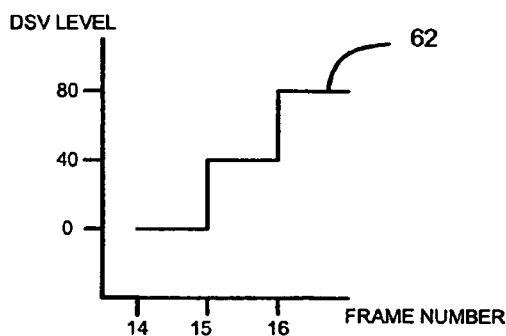
FIG.7a

APPARATUS FOR AND A METHOD OF AUTHENTICATING RECORDING MEDIA

FIELD OF THE INVENTION

This invention relates to apparatus for and a method of authenticating recording media, in particular, but not exclusively, optical digital recording media.

The advent of digital recording techniques has enabled copies of recorded media to be made with little or no loss of copy quality. This makes it very easy for an unauthorised person to produce unauthorised copies of digital recording media. There is therefore a need to provide a user of a digital recording medium with a mechanism for determining whether or not a digital recording medium is authentic or is an unauthorised copy.

SUMMARY OF THE INVENTION

In one aspect, the present invention provides apparatus for authenticating a recording medium, wherein the apparatus comprises a receiver operable to receive operational data relating to an operational characteristic of the recording medium that is affected by authentication data provided by the manner of encoding of some of the data recorded on the recording medium, a profile data determiner operable to determine profile data from received operational data, and a comparer operable to compare the determined profile data with the profile data expected for an authentic recording medium to determine whether the recording medium carries the authentication data.

In an embodiment, the authentication data that affects an operational characteristic of the recording medium is provided by encoding some of the data to be recorded on the recording medium so as to provide an area on the recording medium that has a modified DC characteristic that affects an operational speed of the recording medium in a way that deviates from what would be expected from a recording medium not having the modified DC characteristic. In an embodiment, the recording medium is a disc, such as an optical disc, that is rotated during operation and the authentication data causes the disc to spin down during a reading operation.

In an embodiment, the profile data comprises velocity parameter data that relates speed to position. In an embodiment, the authentication data is recorded so as to provide a modified DC characteristic that affects at least one of an access time, a transfer rate and a seek time for the part of the recording medium having the modified DC characteristic.

The modified DC characteristic may be provided by adjusting a digital sum value (DSV) during encoding of data to be recorded on the recording medium so that the digital sum value changes rapidly, for example to provide a spike in the digital sum value or to provide a region of oscillating digital sum values.

In an embodiment, a digital recording medium such as an optical disc is recorded using an encoding process that is modified to cause a peak or rapid change in the digital sum value in the encoded data for part of the recording data. This provides the corresponding part of the recorded medium with a modified DC characteristic that affects an operational characteristic of the recording medium. This modified DC characteristic will not be present in unauthorised copies of the recording medium because the normal encoding process will encode the recording data so as to minimise DC imbalance. Profile data is obtained from operational data acquired during operation of the recording medium. This profile data is compared with expected profile data, that is the profile data that would be expected to be obtained if the modified DC characteristic is present. The results of this comparison are used to determine whether or not the recording medium is authentic.

The recording medium itself may incorporate an operational data determiner that is operable to cause a reader of the recording medium to determine operational data for the recording medium. As another possibility, the recording medium may incorporate an operational data determiner accessor operable to cause a reader of the recording medium to access an operational data determiner. In this latter case, the operational data determiner may be provided by the reader or may be provided by another apparatus coupled to the reader via, for example, the Internet, an intranet, local area network or wide area network or other similar communications coupling, either wired or wireless.

The expected profile data may be carried by the recording medium but disguised so that its presence cannot be detected by a person trying to create unauthorised copies of disc. As an example, the expected profile data may be hidden within other data recorded on the recording medium. In an embodiment, the code obfuscation technique described in PCT/GB2004/003560 (equivalent to GB0319596.3), the whole contents of which are hereby incorporated by reference, is used to hide the expected profile data on the recording medium. As another possibility, the recording medium may carry, instead of the actual expected profile data, data identifying a location at which the expected profile data can be accessed by the reader for comparison with determined profile data or data identifying a location to which the reader can forward determined profile data so that the determined profile data can be compared remotely with the expected profile data.

Where a recording medium is an authentic recording medium, then an embodiment of the present invention enables a user of that recording medium to be assured that the recording medium is authentic. However, because the authentication data is produced by a modification in the encoding prior to recording and not in the recording data itself, the authentication data will not be reproduced in an unauthorised copy because, during the recording process, the unauthorised recording apparatus will operate in conventional manner to inhibit DC imbalance. Accordingly, if a recording medium is a "ripped" or unauthorised copy, then the required modified DSV characteristic will not be present and the profile data obtained by the profile data determiner will not match the expected profile data. The reader, and thus the user, can therefore be alerted to the fact that the recording medium is an unauthorised copy.

Apparatus and a method embodying the invention enable a recording medium to be provided with authentication data that affects an operational characteristic of the recording medium to enable the authenticity of the recording medium to be checked while still allowing data recorded on the recording medium to be read correctly. The authentication data effectively forms a "watermark" on the authentic recording medium. The watermark is fragile in the sense that it will not reproduce on unauthorised copies because it is provided by the manner in which some of the data to be recorded on the recording medium is encoded for recording and that encoding process will not be reproduced during recording of unauthorised copies.

BRIEF DESCRIPTION OF THE DRAWINGS

Embodiments of the present invention will now be described, by way of example, with reference to the accompanying drawings, in which:

FIG. 6 consists of FIGS. 6a, b and c in which FIG. 6a shows a set of digital data values, FIG. 6b shows the corresponding value to be added to the digital sum value and FIG. 6c shows how the digital sum value (DSV) varies for the data shown in FIG. 6a;

FIG. 7 shows a graph of DSV level against frame number for illustrating one way in which the DSV value may be modified during encoding of data to be recoded on a recording medium so as produce authentication data provided by a modified DC characteristic;

FIG. 7a shows a part of the graph shown in FIG. 7 on an enlarged scale to illustrate steps in the DSV characteristic;

FIG. 9b shows flowchart illustrating processes carried out by the profile authenticator shown in FIG. 9a;

DESCRIPTION OF EMBODIMENTS

Figure 1:
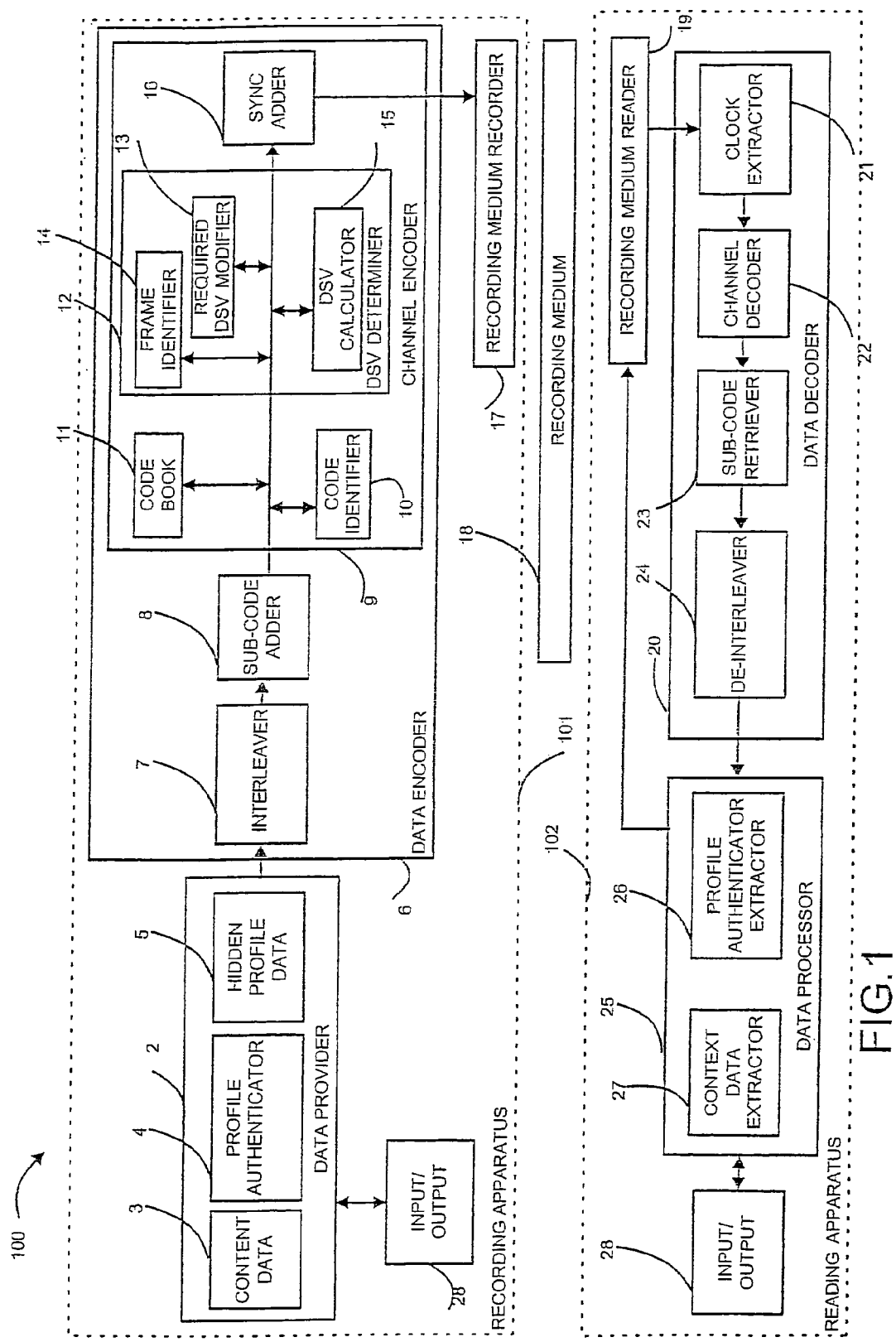
FIG. 1 shows a functional block diagram of a recording system comprising a recording apparatus for recording a recording medium and a reading medium for reading a recording medium embodying the invention.

Referring now to the drawings, FIG. 1 shows a functional block diagram of a recording system 100 comprising a recording apparatus 101 for digitally recording frames of data on a recording medium 18 and a reading apparatus 102 for reading data digitally recorded on a recording medium 18. It will be appreciated that, generally, the recording apparatus 101 and reading apparatus 102 will not be located in the same place. Thus, usually, the recording apparatus will be provided at the commercial facility at which the recording media are to be manufactured while the reading apparatus will be located at the premises of the end user of the recording medium. The end user may be, for example, a private individual, a commercial organisation, or an academic institution.

The recording apparatus 101 is configured to control the manner in which some of the data to be recorded on the recording medium is encoded so as to enable an area of a recording medium 18 to be provided with authentication data in the form of an area of the recording medium having a modified DC characteristic that affects an operational characteristic of the recording medium but that does not prevent correct reading of the recording medium 18.

The reading apparatus 102 is configured to determine profile data resulting from the operational characteristic affected by the authentication data and to check the authenticity of the recording medium by comparing the determined profile data against expected profile data.

The expected profile data may, for example, be generated from a measured operational characteristic of a test or reference sample of the recording medium carrying the authentication data. The expected profile data may be derived from operational data for the entire test or reference sample or for just a region encompassing the area in which the profile authenticator 4 expects to find the modified DC characteristic.

In this example, the operational characteristic affected by the authentication data is a speed characteristic of the recording medium and the expected profile data may be, for example, a speed-frame profile generated during reading of the test or reference sample or could be, for example, a profile parameter representing, for example, the gradient of the slope of a part or parts of that speed-frame profile.

As another possibility, the expected profile data may be an s-a-t velocity-position (velocity-frame number) profile parameter data derived from operational data representing the time taken by a reading apparatus to find data on the test or reference sample (the seek time s) as a function of frame number, the time taken by the reading apparatus to access data (the access time a) on the test or reference sample as a function of frame number and the time taken for data to be transferred (the transfer rate t) from the test or reference sample to the reading apparatus as a function of frame number.

As shown in FIG. 1, the recording apparatus comprises a data provider 2 for providing content data 3 to be recorded on the recording medium. In addition to the content data 3, the data provider 2 also provides a profile authenticator 4 for determining whether profile data derived from operational data relating to an operational speed of the recording medium matches expected profile data for that recording medium.

In this example, the data provider 2 also provides the expected profile data. The expected profile data 5 is obfuscated or hidden amongst other data so that the existence of the expected profile data on the recording medium is not evident. The data provider 2 is thus provided to assemble the content data 3, the profile authenticator 4 and the hidden profile data 5 (collectively "the recording data").

The data provider 2 is coupled to a data encoder 6 which comprises an interleaver 7 for subjecting 8-bit data words or "data symbols" to an interleaving process which re-distributes the data symbols so that consecutive data symbols are not recorded consecutively. The interleaver 7 is coupled to a sub-code adder 8 for adding to the interleaved data sub-code bits that provide control data.

The sub-code adder 8 is coupled to a channel encoder 9 for converting eight bit data symbols into channel code. The channel encoder 9 includes a code identifier 10 associated with a code book 11 (generally provided in the form of a look-up table (LUT)) which, for each possible eight bit data symbol, provides a number of alternative code words. The channel encoder 9 also includes a digital sum value (DSV)

determiner 12 for assisting the code identifier 10 in selecting the code word for an eight bit data symbol. The channel encoder 9 also includes a SYNC adder 16 for adding SYNC code (synchronization code) which is selected by co-operation with the DSV determiner to avoid continued increase or decrease of DSV beyond a certain number of SYNC frames, for example two SYNC frames.

The DSV determiner 15 includes a required DSV modifier 13 and a frame identifier 14 for enabling the DSV value for a set of frames to be modified so as to provide the recording medium 18 with the authentication data.

The channel encoder 9 is coupled to a recording medium recorder 17 for recording the encoded data on a recording medium. In this example, the recording medium 18 is an optical disc and the recording medium recorder 17 is an optical disc recorder configured to record optical discs in accordance with one or more known optical disc formats such as, for example, the CD Audio, CDROM and DVD formats.

The recording apparatus 102 shown in FIG. 1 comprises a recording medium reader 19 for reading a recorded recording medium 18. As, in this example, the recording medium 18 is an optical disc, the recording medium reader 19 is an optical disc reader configured to read optical discs recorded in accordance with a given optical disc format.

The recording medium reader 19 is coupled to a data decoder 20 which includes a clock extractor 21 for extracting a clock signal from the signal supplied by the recording medium reader 19, a channel decoder 22 for decoding the channel code, a sub-code retriever 23 for receiving sub-code data and a de-interleaver 24 for de-interleaving the data to provide decoded data representing the original data provided by the data provider 2.

The data decoder 20 is coupled to a data processor 25 which has a profile authenticator extractor 26 for extracting the profile authenticator 4 from the decoded data and a content data extractor 25 for extracting content data 3 from the decoded data. Each of the recording and reading apparatus 101 and 102 also has user input/output device(s) 28 for enabling interaction with a user.

Figure 2:
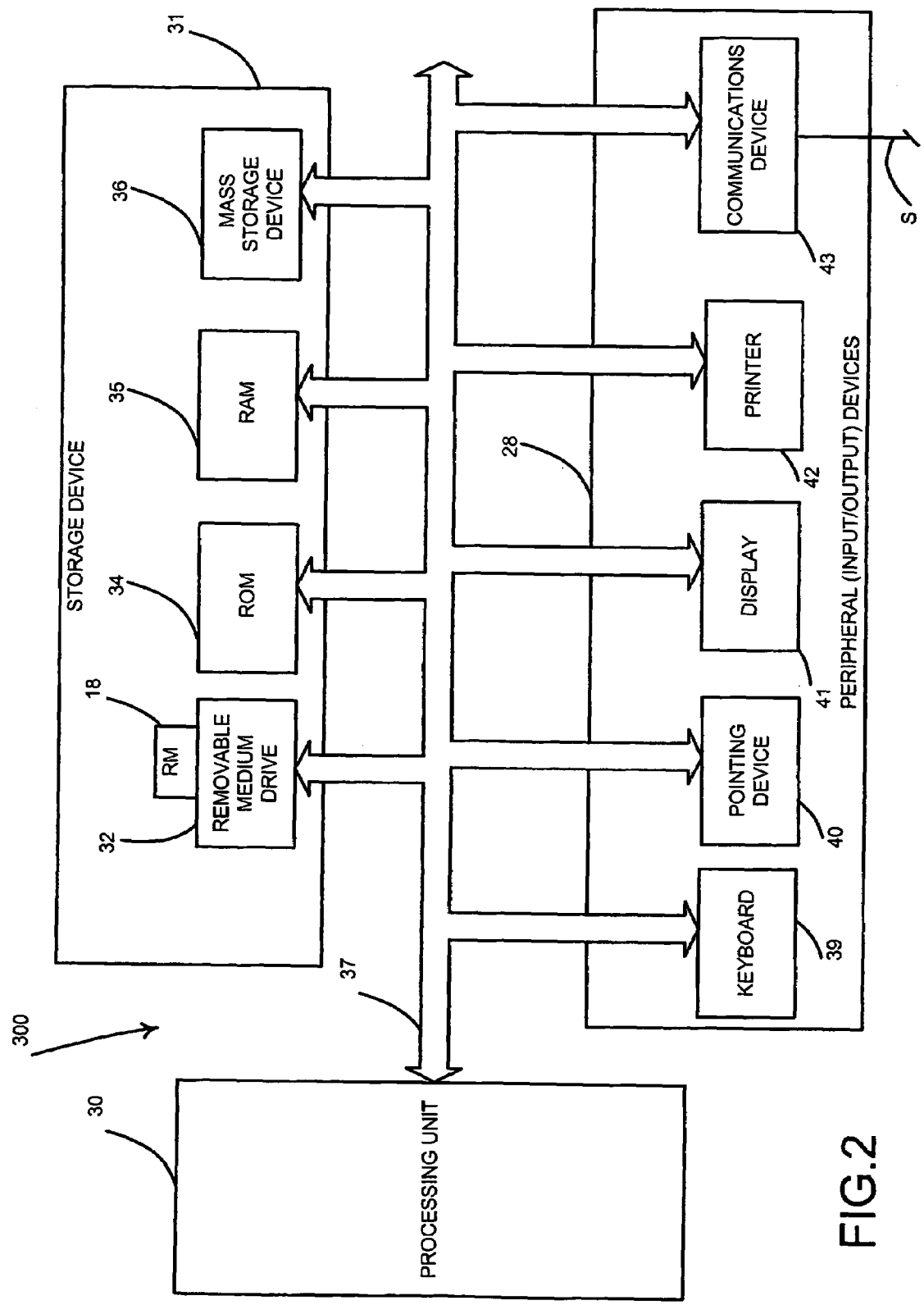
FIG. 2 shows a block diagram of apparatus that may be programmed to provide a recording or reading apparatus.

FIG. 2 shows a functional block diagram of processing apparatus 300 that may be programmed by program instructions to provide at least one of the recording apparatus 101 and the reading apparatus 102 shown in FIG. 1.

As shown in FIG. 2, the processing apparatus 300 comprises a processing unit 30 coupled via a bus 37 to storage devices 31 which, as shown, comprise a removable medium drive 32 for receiving a removable medium 18, a read only memory (ROM) 34, random access memory (RAM) 35 and a mass storage device 36 such as a hard disc drive. The bus 37 also couples the processing unit 30 to a number of input/output or peripheral devices 28. As shown the peripheral devices comprise a keyboard 39, a pointing device such as a mouse 40, a display 41, a printer 42 and a communications device 43 such as a MODEM, a network card or the like for enabling the processing apparatus 300 to communicate with other processing apparatus via a network such as the Internet, an intranet, a local area network, a wide area network, via either a wired or a wireless coupling. It will of course be appreciated that the storage device(s) and input/output devices may not comprise all of those shown in FIG. 2 and/or could comprise additional devices. For example one or more further removable medium drives 32, such as a floppy disc drive, may be provided and other input/output devices such as microphones and loudspeakers may be provided.

Where the processing apparatus 300 is to provide the recording apparatus 101, then the removable medium drive 32 will provide the recording medium recorder 17. Where the processing apparatus 300 is to provide the recording apparatus 101, then the removable medium drive 32 will provide the recording medium reader 19. It will, of course, be appreciated that the removable medium drive 32 may be capable of both reading and writing recording media.

Figure 3:
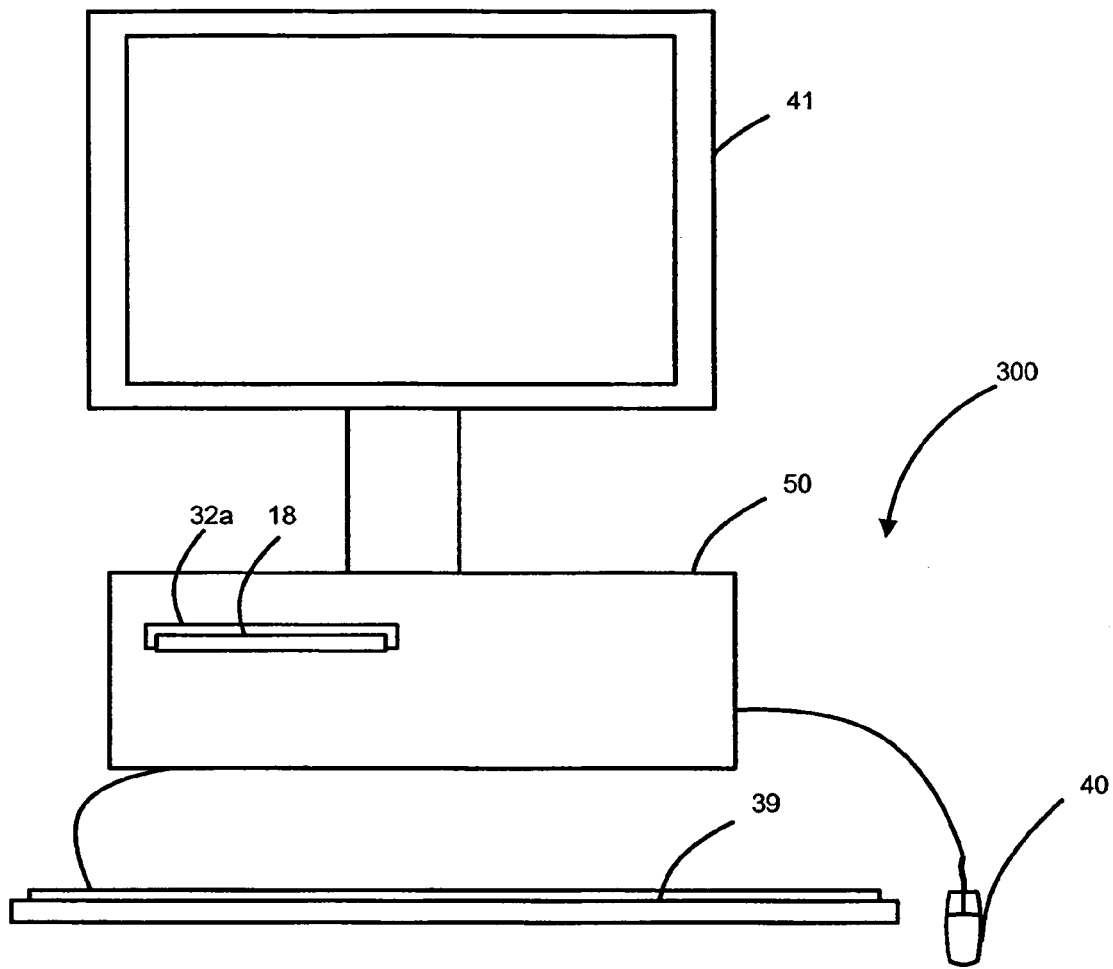
FIG. 3 shows a schematic diagram of one example of a reading apparatus.

FIG. 3 shows a diagrammatic illustration of a typical example of the processing apparatus 300. In this example, the processing apparatus 300 comprises a personal computer having a main processor unit 50 containing the processing unit 30 and storage devices 31. In this example, the input/output devices 28 comprise a display 41 supported on the main processor unit 50 and a keyboard 39 and a pointing device 40 in the form of a mouse with both the keyboard 39 and the mouse 40 coupled to the main processor unit 50. FIG. 3 shows a recording medium 18 being inserted into the insertion slot 32a of the removable medium drive 32.

The processing apparatus 300 shown in FIGS. 2 and 3 may be programmed to provide the recording apparatus 101 or the reading apparatus 102 by program instructions supplied by any one or more of the following routes:

1. pre-stored in the ROM 34 and/or on the mass storage device 36;
2. input by a user using an input device such as the keyboard 39 and/or pointing device 40;
3. downloaded from a removable medium 18 received in the removable medium drive 32; and
4. supplied as a signal S via the communications device 43.

The operation of the recording apparatus will now be described with the aid of FIG. 4 which shows a top level flowchart illustrating the main processes carried out by the recording apparatus 101 in the recording of a recording medium 18.

Thus, at S1 the data provider 2 assembles the content data 3, the profile authenticator 4 and the hidden profile data 5 (collectively "the recording data") in the order in which the recording data is to be digitally recorded on the recording medium 18. The content data 3 may be any form of digital data suitable for recording on the recording medium such as one or more of: audio data, video data, graphics data, visual data, animation data, numerical data, program data, and control and access data. Any suitable manner of producing the hidden profile data 5 may be used. As an example, the method of code obfuscation described in PCT/GB2004/003560 (equivalent to GB0319596.3), the contents of which are hereby incorporated by reference, may be used.

Figure 4:
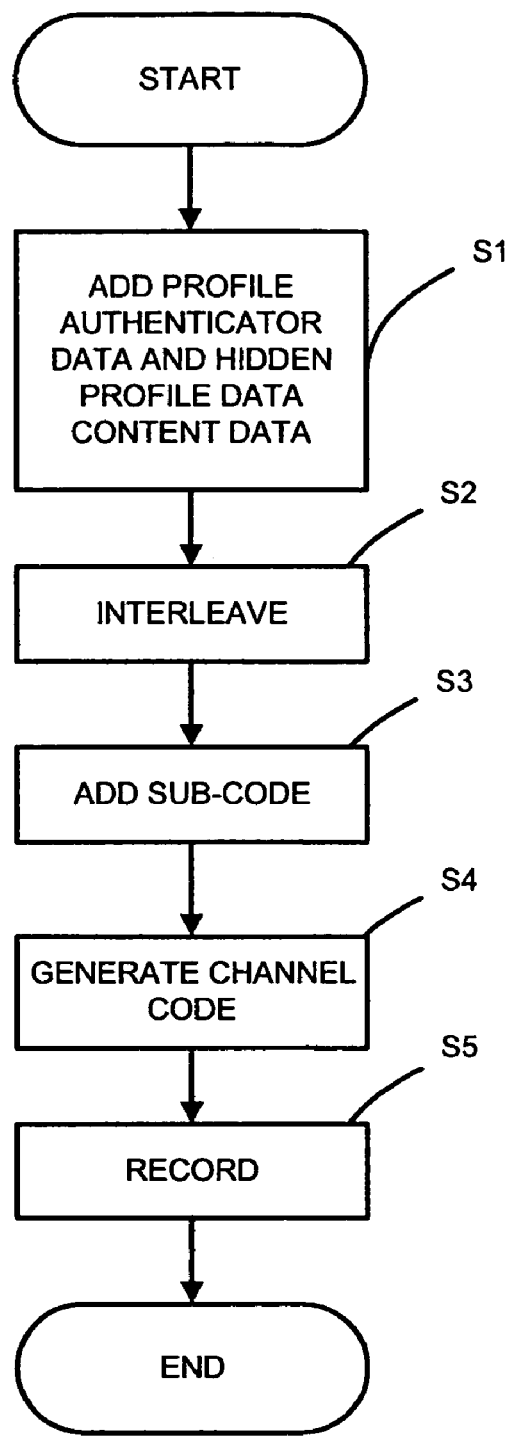
FIG. 4 shows a flowchart for illustrating processes during recording of a recording medium.

At S2 in FIG. 4, the interleaver 7 splits the recording data for a frame into 8 bit data symbols and then subjects the data symbols to an interleaving process which re-distributes the data symbols so that consecutive data symbols are not recorded consecutively. In this example, Cross Interleave Reed-Solomon Coding (CIRC) is used which employs a combination of interleaving and parity to reduce the effect of random and burst errors on the recording medium, for example to reduce or hide the problems that would otherwise be caused by a dust particle or small scratch on the recording medium. The data may be shuffled in a pseudo-random manner before interleaving to avoid an uncorrectable error resulting in a block of failed data values, pixels in the case of an image.

After the interleaving process, at S3 the sub-code adder adds eight bit sub-code (sometimes known as PQ code because only those two code bits are used in the audio format) to each frame of interleaved data. The nature of the sub-code will depend upon the particular recording format. Thus, for example, in the case of the CD audio format, generally only the P and Q sub code bits are required whereas in the case of the CDROM format sub-code bits from 98 consecutive frames are collected to form sub-code blocks for the sector. The sub-code provides sub-channels containing control data for the discs with the P and Q sub-channels incorporating timing and navigation data for tracks on the recording medium.

At S4 in FIG. 4, the channel encoder 9 produces a channel code word for each eight bit data symbol by identifying, using the code book 11, the possible code words for that data symbol and selecting one of those code words on the basis of a running digital sum value (DSV) determined by the DSV determiner 12.

The channel encoder 9 operates in accordance with a channel coding scheme, in this example either the eight fourteen modulation (EFM) coding scheme or the EFM-plus coding scheme. The EFM modulation scheme is described in a paper entitled "EFM—The Modulation Method for the Compact Disc Digital Audio System" by Hiroshi Ogawa and Kees A. Schouhamer Immink published in the collected papers from the AES Premier Conference, Rye, New York 1982 at pages 178-181 while the EFP plus encoding scheme is described in a paper entitled "EFM Plus: The Coding Format of the Multi-Media Compact Disc" by Kees Immink published in IEEE Transactions on Consumer Electronics, Volume CE 41, pages 491-497 August 1995.

Where the channel encoder 9 operates in accordance with the EFM encoding scheme the code book 11 contains, for each eight bit data symbol, a number of possible fourteen bit channel code words and sets of merge bits are used to merge together adjacent channel code words. In this case, the channel code identifier 10 and DSV determiner 12 co-operate to select both the channel code word for a particular data symbol and the merge bits between channel code words in accordance with the coding scheme rules.

Where the channel encoder 19 implements the EFM-plus coding scheme, the code book 11 stores a choice of four different sixteen bit channel words for each eight bit data symbol and the code identifier 10 and DSV determiner 12 co-operate to select a channel code word for each data symbol in accordance with the coding scheme rules.

The EFM and EFM-plus coding scheme rules place upper and lower limits on signal frequencies (run-length limits) within the recorded coded data and also control the digital sum value (DSV) with the aim of suppressing DC imbalance, so as to avoid the coding process detrimentally affecting reading or playback of recorded recording media.

The maximum run length limit is selected to ensure that sufficient number of transitions occur to enable regeneration of a clock signal by the reading apparatus 102. The minimum run length limit is selected to reduce the possibility of inter-symbol interference resulting from the finite size of the reading signal (the light spot in the case of an optical reader) of the reading head of the recording medium reader 19.

The recording scheme uses, in this example, a "non-return to zero inverted" (NRZI) data storage scheme in which the stored signal inverts every time a one is encountered, so that the run-length limits define minimum and maximum consecutive runs of zeros. In the CD Audio and CDROM formats, these minimum and maximum are three and eleven and the run length limit is therefore sometimes referred to 3T-11T where T is a one bit period, so defining for conventional CD audio and CDROM speeds, a highest signal frequency of 720 kHz and a lowest signal frequency of 196 kHz in the recorded coded data.

The digital sum value (DSV) should be as close to zero as possible so as to suppress DC imbalance because constant and low frequency deviations cause servo system gain variations and noise, respectively, which make it difficult for the servo system of the reading apparatus 102 to maintain the reading head on track.

The DSV calculator 15 determines the digital sum value (DSV) by allocating a minus one (−1) to every 0 in the coded data and a plus one (+1) to every 1 and in the code data and summing the −1 and +1 to provide the DSV value or level as running sum value that indicates any DC offset.

FIG. 6a shows an example of a coded data stream while FIG. 6b shows the corresponding allocated −1 and 1 values and FIG. 6c shows a line representing the change in the DSV level as the values shown in FIG. 6b are accumulated. FIG. 6a is not intended to represent an actual data stream but has been chosen so as to emphasize the effect of the 0s and 1s of the coded data on the DSV level. As can be seen from FIGS. 6b and 6c, accumulation of −1s, (that is successive zeros in the coded data) causes a decrease in the digital sum value level while accumulation of +1s, (that is consecutive ones in the coded data) causes an increase in the DSV value.

The SYNC adder 16 adds SYNC code which is selected by co-operation with the DSV determiner 15 to avoid continued increase or decrease of DSV beyond, for example, two SYNC frames.

Figure 5:
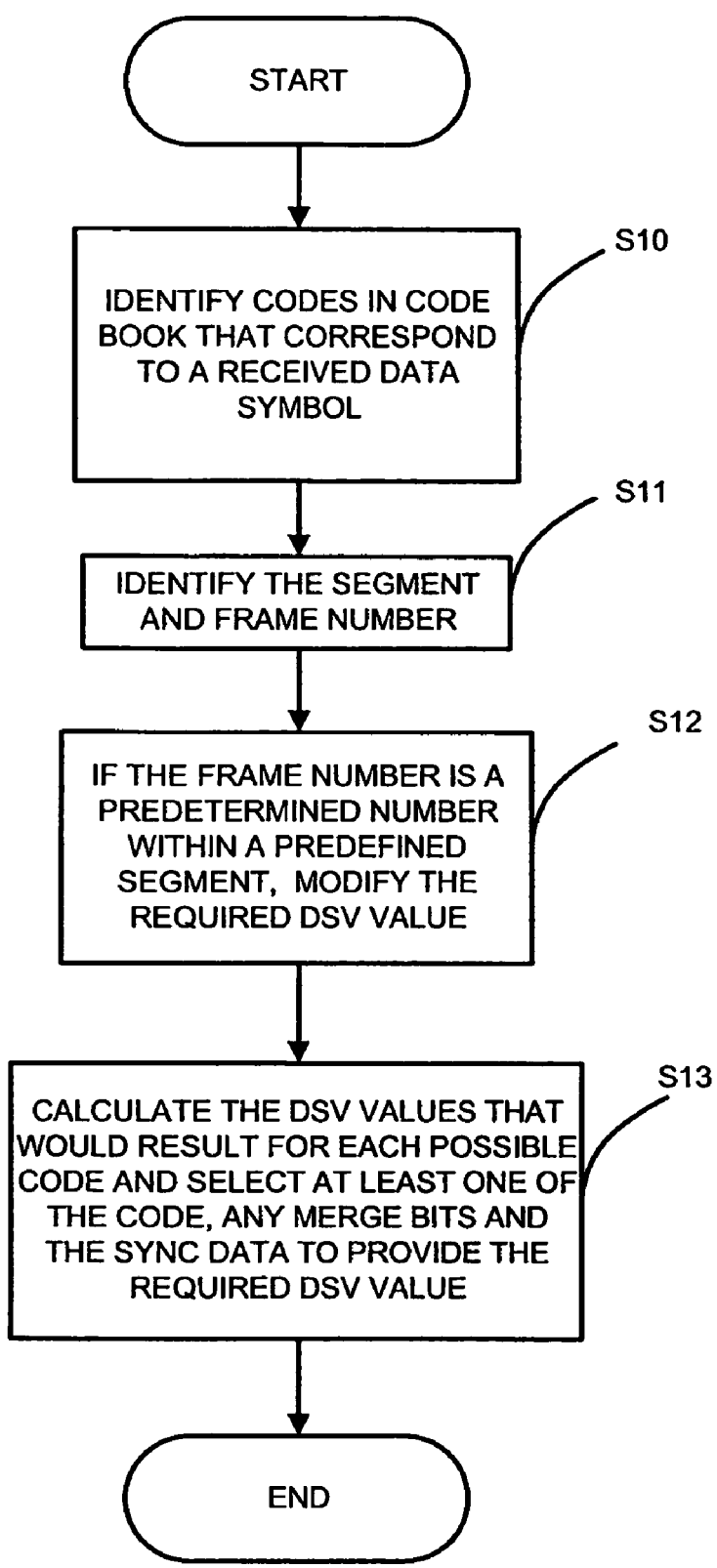
FIG. 5 shows a flowchart illustrating processes in the generation of channel code during recording of a recording medium.

FIG. 5 shows a flowchart illustrating in greater detail the process of generating the channel code for each data symbol.

Thus, at S10 the code identifier 10 identifies the codes in the code book 11 that correspond to the received data symbol and at S11 the frame identifier 14 determines the number of the frame to which the data symbol currently being encoded belongs. The number of the frame may be determined by, for example, the frame identifier 14 keeping a count of the number of frames that have already been encoded.

If at S12 the frame identifier 14 determines that the frame number matches a predetermined frame number, then the frame identifier 14 communicates with the required DSV modifier 13 to cause the required DSV modifier 13 to commence modification of the required DSV value.

At S13, the DSV calculator 15 calculates the DSV values that would result for each possible code identified by the code identifier 10 for the data symbol currently being encoded and the DSV calculator 15 and code identifier 10 co-operate to select at least one of the code, any merge bits and SYNC data to provide the required DSV value. The required DSV value may or may not have been modified by the required DSV modifier 13, depending upon the frame number identified by the frame identifier 14.

The DSV calculator 15 and code identifier 10 normally co-operate in conventional manner to maintain the DSV value as close to zero as possible, that is normally the required DSV value is zero. However, when the frame identifier 14 determines that the frame number matches the predetermined frame number, then the frame identifier communicates with the required DSV modifier 13 to cause the required DSV modifier 13 to commence modification of the required DSV value so as to produce a region of coded data that, when recorded on the recording medium, provides an area of recorded data having a modified DC characteristic which forms the authentication data or fragile watermark for authenticating the recording medium. Generally, the predetermined frame number will represent a frame in a program area rather than a content area of the recording medium. The program area is to be preferred because this area is always readable by a standard SCSI (Small Computer System Interface) command, unlike other area like the lead-out or the lead-in. However, any suitable area may be used.

In this example, when the frame identifier 14 identifies that the n+14th frame has been coded, the frame identifier 14 communicates with the required DSV modifier 13 to cause modification of the DSV value to commence. In this example, the required DSV modifier 13 modifies the required DSV for frames n+14 to n+70 so that the required DSV value increases with a linear step change of 40 per frame from a value of zero at frame n+14 to a value of 1120 at frame n+42 and then decreases linearly from frame n+42 back to a value of zero at frame n+70. FIG. 7 shows a graph of DSV level against frame number (where n represents the nth frame) to illustrate the general manner in which the required DSV modifier 13 modifies the required DSV value in this example. It will, of course, be appreciated that the required DSV modifier 13 changes the required DSV in a step-by-step manner. To illustrate this, FIG. 7a shows a part of the DSV characteristic of FIG. 7 on an enlarged scale. As can be seen from FIG. 7, in this example, the required DSV modifier 13 is configured to modify the required DSV so as to cause the DSV curve 61 to have a generally triangular or spike-like modified DSV characteristic 62.

Returning to FIG. 4, the data encoder 6 provides the resulting channel code data to the recording medium recorder 17 as frames of data each of which consists, as described in WO2004/066294, of recording data together with recording medium information and control data comprising synchronisation data, header data, mode selection data, extended error detection data and correction data. Where the recording format is the CD audio format, then the frames will consist of 24 bytes whereas where the recording format is the CDROM format, then the frames will be organised in sectors consisting effectively of 98 consecutive frames linked via the sub-code field to provide a block long enough to handle numerical data as one sector without altering the audio CD format.

At S5 in FIG. 4, the recording medium recorder 17 records the channel code data on to a master optical disc in conventional manner by forming pits separated by lands in accordance with the channel code data. As a final part of the recording process, the recording medium recorder 17 records a table of contents (TOC) on the recording medium. The master produced by the recording medium recorder 17 may then be used in conventional manner to produce recording media for supply to the end user.

At the end of the recording process, the recording medium 18 carries the content data, profile authenticator and hidden profile data. In addition, an area of the recorded data, typically in the program area, carries authentication data provided by an area having a modified DSV characteristic, for example a spike-like modified DSV characteristic as shown in FIG. 7.

The rapidly changing modified DSV characteristics shown in FIG. 7 is designed so as to affect an operation of the recording medium 18 in use without affecting the readability of the recording medium 18. Thus, the modified DSV characteristic shown in FIG. 7 provides a modified DSV value characteristic that changes rapidly so as to cause the read head servo tracking system of the reading apparatus to lose track briefly (and thus cause the recording medium to spin down) but that occurs over a relatively small number of frames so that the servo tracking system can easily re-establish tracking control.

The modified DSV characteristic that is produced by the required DSV modifier 13 is thus not as extreme as the modified DSV characteristic that results when an attempt is made to produce an unauthorised copy of a recording medium carrying unbalanced DC content as described in WO2004/066294. Thus, as can be seen from a comparison of FIG. 7 of the present application and FIG. 9 of WO2004/066294, the modified DSV characteristic that arises as a result of unauthorised copying of recording media carrying unbalanced DC content in WO2004/066294 persists for just under one hundred frames and peaks at a maximum DSV level of over three thousand five hundred. In contrast, the modified DSV characteristic 62 shown in FIG. 7 extends over about half the number of frames and has a peak DSV level of less than a third of the peak DSV level shown in FIG. 9 of WO2004/066294.

As described above, the change in the DSV level will generally be on a frame-by-frame because this is more easy to calculate. However, the change could be on a symbol-by-symbol or every predetermined number of symbols.

The modified DSV characteristic 60 may have a peak DSV level higher than that shown in FIG. 7, for example the step change in the DSV value between frames may be increased up to as much as 80 per frame over 28 frames so that the maximum DSV value is 80*28=2240.

The modified DSV characteristic 62 may extend over a smaller or slightly larger number frames than that shown in FIG. 7, for example the number of frames over which the DSV characteristic 62 extends may be as small as about 36 frames and as large as about 80 frames.

The triangular modified DSV value characteristic 62 shown in FIG. 7 is particularly efficient because it enables the most rapid change of DSV level over the smallest number of frames. It would, however, be possible have modified DSV characteristics with different shapes, such as a frustoconical or rectangular shape. The DSV characteristic need not necessarily increase and decrease in a linear fashion. Thus, the size of the DSV step change between frames (or symbols) could vary (either increase or decrease) with each step or each predetermined number of steps. In addition, although the general change in DSV level will be to increase to the peak value and then decrease, not all of the individual steps need necessarily be the same direction as the general change in level so that, for example, some of the steps during the increase to the peak may actually decrease the DSV value. Although as so far described the DSV characteristic has a single peak, this need not necessarily be the case; the DSV characteristic may have two or more peaks of the same or different heights and may even vary in an oscillatory manner. Also, the modified DSV value characteristic need not necessarily be symmetric, it could it be asymmetric.

The resulting speed profile will of course be dependent on the DSV characteristic so that a DSV characteristic having a higher peak value produces a bigger change in the speed profile.

Figure 8:
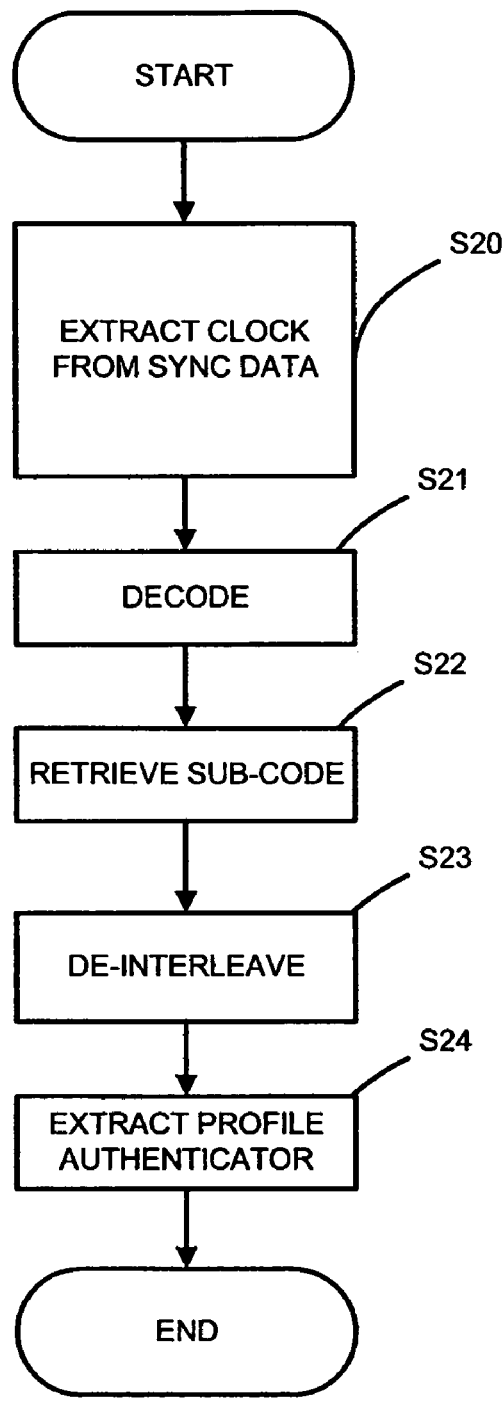
FIG. 8 shows a flowchart illustrating processes involved in reading a recording medium.

FIG. 8 shows a flowchart illustrating processes carried out by the reading apparatus 102 when the recording medium 18 is inserted into the insertion slot 32a of the recording medium reader 19 provided by the removable medium drive 32 in FIG. 2.

Thus, when the recorded recording medium 18 is inserted into the insertion slot 32a, then, in accordance with instructions in the boot sector of the recording medium 18, the recording medium reader 19 uses the table of contents to locate the part of the recording medium 18 carrying the coded data representing the profile authenticator.

The data decoder 20 carries out conventional processes including extraction of the clock signal at S20, decoding of the channel code at S21, retrieval of the sub-code at S22 and de-interleaving (with de-shuffling beforehand if the data was shuffled prior to interleaving) at S23 in FIG. 8 of the data to retrieve the data representing the profile authenticator.

Then, at S24, the profile authenticator extractor 26 extracts the profile authenticator 26 from the read decoded data.

Figure 9A:
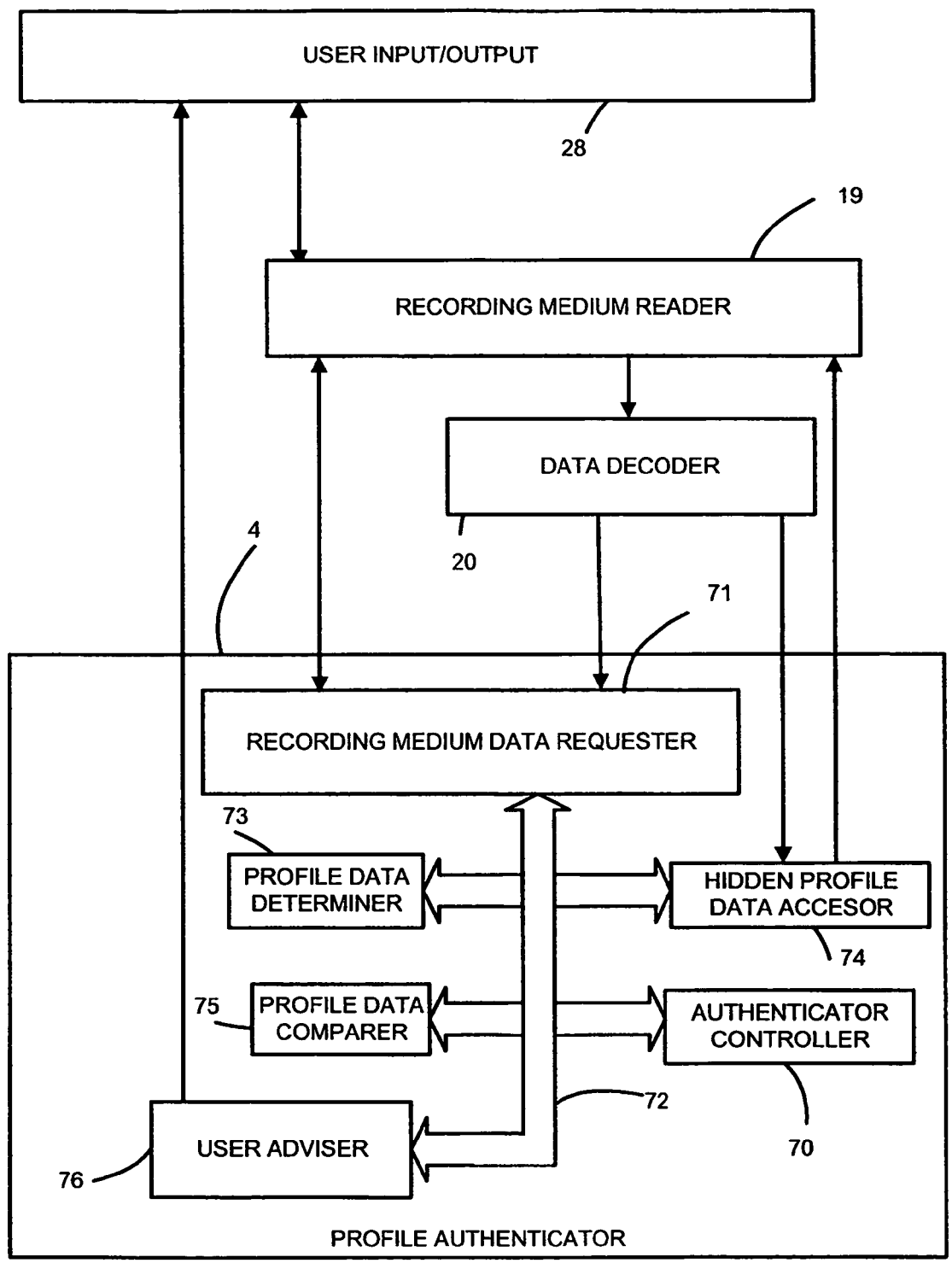
FIG. 9a shows a functional block diagram illustrating the functional components of a profile authenticator.

FIG. 9a shows a functional block diagram illustrating the functional components of the profile authenticator 4 extracted by the profile authenticator extractor 26.

As shown in FIG. 9a, the profile authenticator 4 has a profile authenticator controller 70 for controlling overall operation of the profile authenticator 4 and a recording medium data requester 71 for requesting the recording medium reader 19 to read at least the part of the recording medium where the profile authenticator controller 70 expects to find the modified DSV characteristic. The profile authenticator 4 also has a profile data determiner 73 for determining profile data from operational data acquired from the recording medium 18, a hidden profile data accessor 74 for accessing the hidden expected profile data on the recording medium 18, a profile data comparer 75 for comparing the profile data determined by the profile data determiner 73 with the hidden expected profile data and a user adviser 76 for supplying to a user information indicating whether or not the profile data determined by the profile data determiner 73 agrees with the expected profile data, for example by displaying a message on the display screen 41 of the user input/output 28 indicating whether or not the recording medium is authentic. The various functional components of the profile authenticator communicate via a bus 72.

Operation of the profile authenticator 4 will now be described with reference to FIGS. 9a and 9b.

Figure 9B:
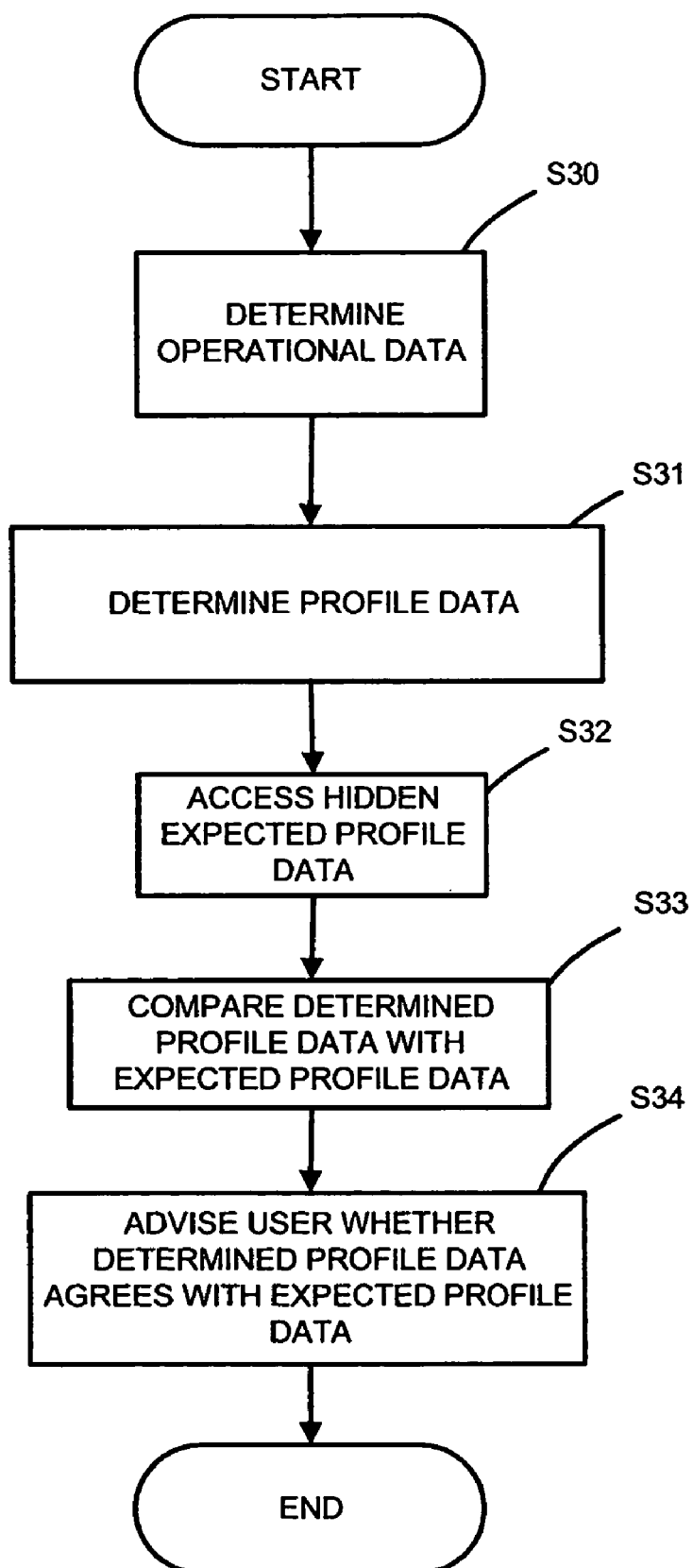

At S30 in FIG. 9b, the recording medium data requester 71 of the profile authenticator 4 requests the recording medium reader 19 to access the recording medium 18 to enable the required operational data to be determined. The operational data required will of course depend on that used to generate the expected profile data.

Figure 16:
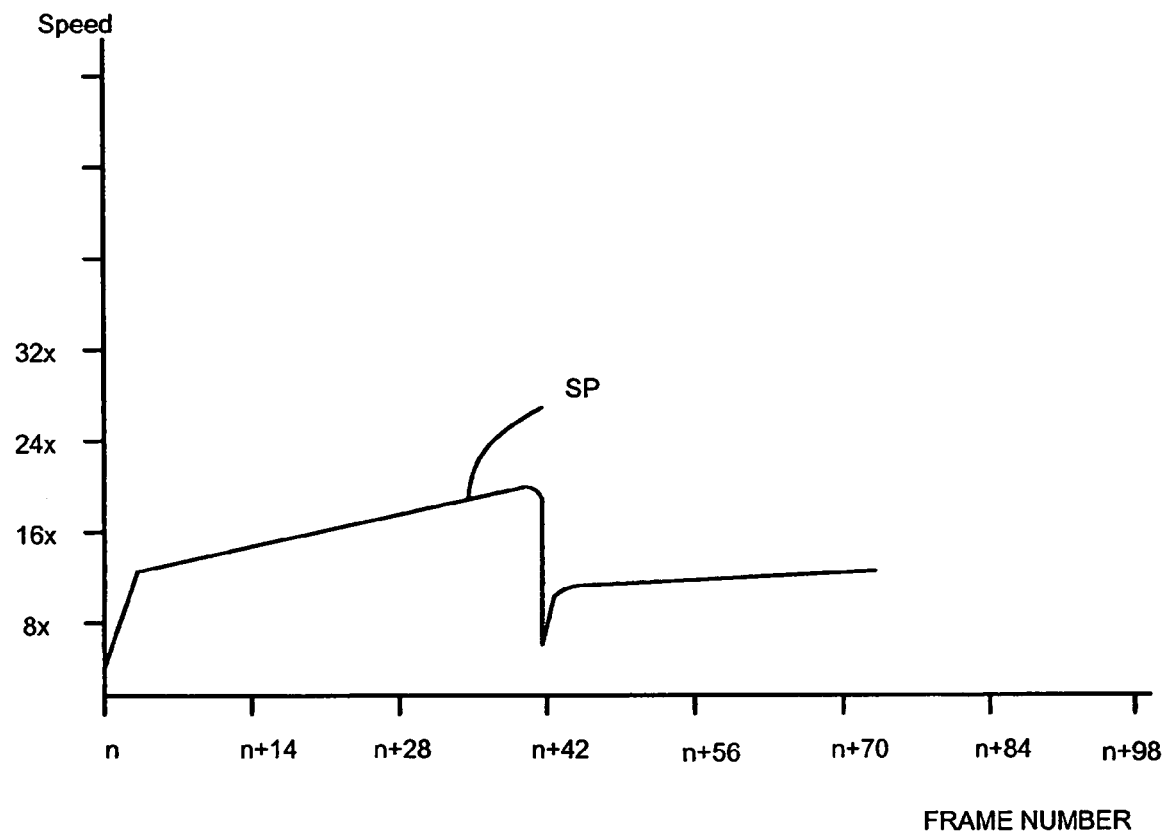
FIG. 16 shows a diagrammatic graphical representation of recording medium speed as a function of frame number to illustrate the effect of a modified DC characteristic on an operational characteristic of the recording medium.

FIG. 16 shows a very diagrammatic representation of recording medium rotation speed against frame number. As can be seen by comparing FIGS. 7 and 16, the rotational or spin speed of the recording medium dips dramatically in the area of the recording medium have the modified DSV characteristic. This change in rotational speed occurs, as explained above, because the servo tracking system of the recording medium reader 19 momentarily loses track in the area having the modified DSV characteristic.

The profile data determiner 73 derives profile data from the recording medium operational data at S31 in FIG. 9b. The profile data should, if the recording medium is authentic, match the hidden expected profile data 5.

The nature of the derived profile data will of course be the same as that of the expected profile data. The profile data will generally be the speed-frame profile illustrated diagrammatically in FIG. 16. However, the profile data could be, for example, a profile parameter representing, for example, the gradient of the slope of a significant part of the speed-frame profile. As another possibility, the profile data may be the s-a-t velocity-position (velocity-frame number) parameter described above based on operational data representing, as a function of frame number (that is position on the recording medium), the time taken by the reader 19 to find data on the recording medium 18 (the seek time s), the time taken by the reader 19 to access data (the access time a) on the recording medium 18 and the time taken for data to be transferred (the transfer rate t) from the recording medium to the reader 19.

Then, at S32, the hidden profile data accessor 74, under the control of the authenticator controller 70, requests the recording medium reader 19 to read the region of the recording medium at which the profile authenticator 4 expects to find the hidden expected profile data 5. In response, the recording medium reader 19 uses the table of contents on the recording medium to access the requested region of the recording medium. The read data is decoded by the data decoder 20 and supplied to the hidden profile data accessor 74 which extracts the expected profile from the received hidden profile data.

The expected profile data represents the profile data that should be determined by the profile authenticator if the recording medium is authentic. Thus, as set out above, the expected profile data represents profile data obtained by the recording medium manufacturer for a test or sample recording medium carrying the same modified DSV characteristic as the manufactured recording medium 18. The expected profile data will generally be obtained by a profile data determiner similar to the profile data determiner 73 described above. The profile data determiner may be, for example, a commercially available piece of software such as Nero 6 supplied by Nero AG of Glendale, Calif., USA.

Once the hidden profile data accessor 74 has extracted the expected profile data, then at S33 the profile data comparer 75 compares the determined profile data with the extracted expected profile data. Where the profile data represents the form of the speed against frame curve shown in FIG. 16, then the profile data comparer 75 may use a pattern-matching or curve-fitting technique. Where the profile data is more simple, for example a value for the gradient of a characteristic part of the speed against frame profile, then the profile data comparer 75 may simply compare the two values.

Because the authentication data is produced by a modification in the encoding prior to recording and not in the recording data itself, the authentication data will not be reproduced in an unauthorised copy. This is because, during the recording process, the channel encoder of the unauthorised recording apparatus will operate in conventional manner to avoid DC imbalance, that is to ensure that the DSV value is as close to zero as possible. Accordingly, if the recording medium 18 is a "ripped" or unauthorised copy, then the required modified DSV characteristic will not be present and the profile data obtained by the profile data determiner 73 will not match the expected profile data provided in the hidden profile data 6 stored on the recording medium 18.

The profile data comparer 75 supplies, at S34, information to a user adviser 76 indicating whether or not the derived profile data agrees with the extracted expected profile data and the user adviser 76 communicates with the user by, for example, displaying a message on the display screen 41 of the input/output 28 indicating whether or not the recording medium 18 is authentic.

Thus, the system described above with reference to FIGS. 1 to 9b enables a user to be advised whether or not the recording medium that they have inserted into their recording medium drive is an authentic or authorised copy.

In the embodiment described above with reference to FIGS. 1 to 9b, the expected profile data is itself carried by the recording medium 18 and is hidden or obfuscated so that a person "ripping" or producing an unauthorised copy of the recording medium would not be aware of the significance of this data.

Figure 10:
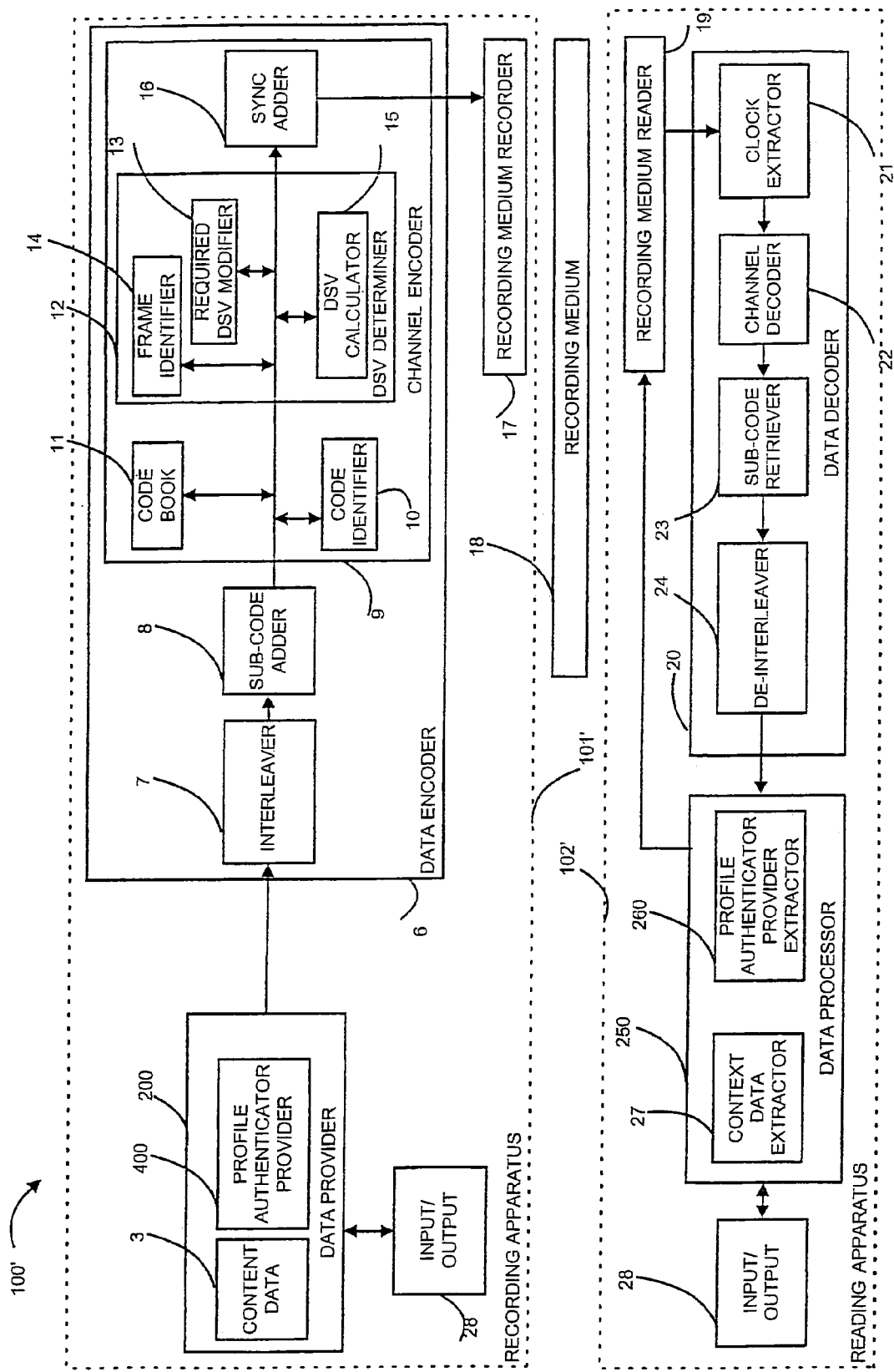
FIG. 10 shows another example of a system comprising a recording apparatus and a reading apparatus embodying the present invention.
Figure 11:
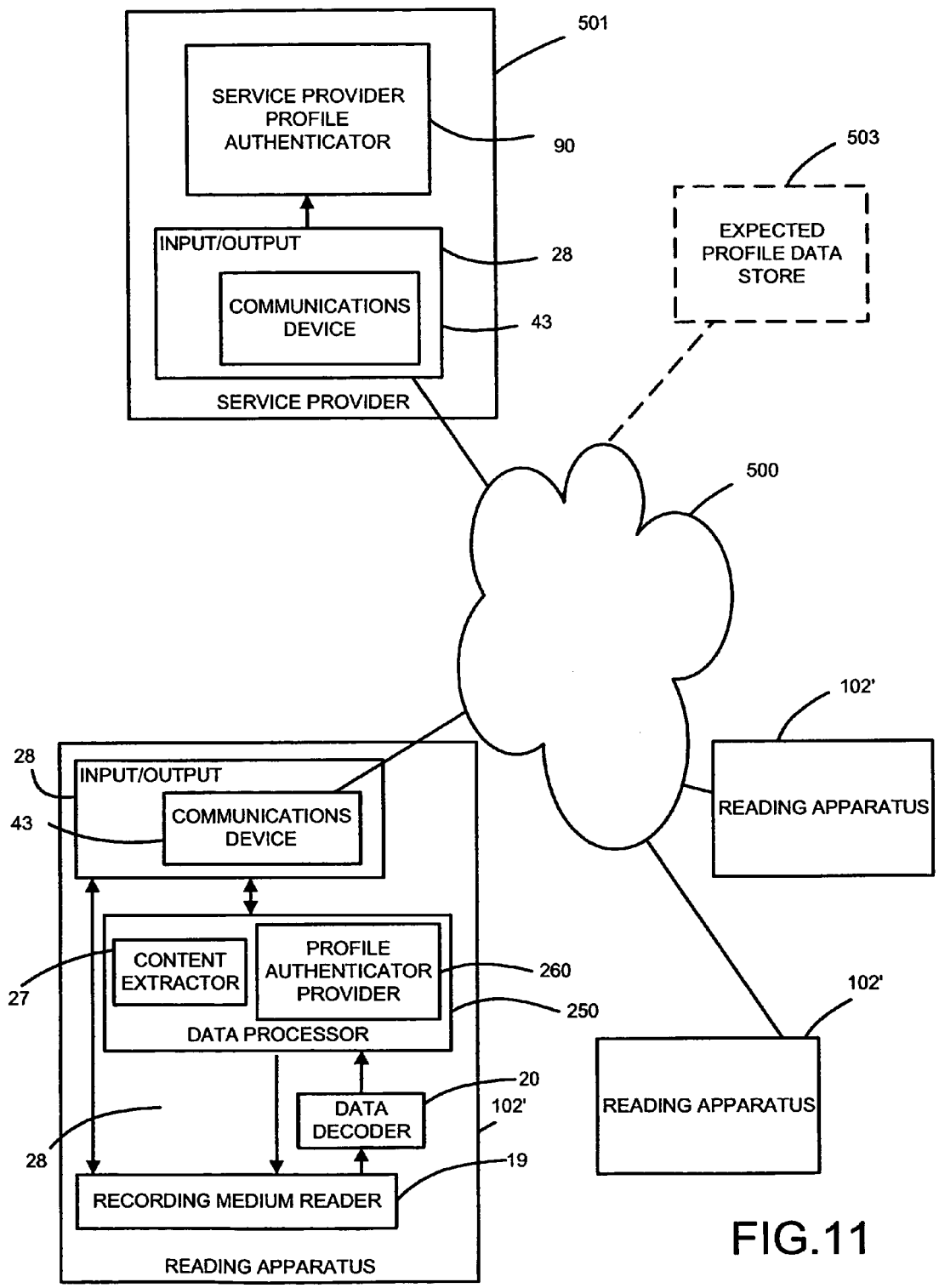
FIG. 11 shows very diagrammatically a network system in which a recording apparatus embodying the invention is coupled to a service provider via a network to enable authentication of a recording medium.

Another embodiment of the present invention will now be described with reference to FIGS. 10 to 15 in which FIG. 10 shows another example of a system 100' comprising a recording apparatus 101' and a reading apparatus 102' embodying the present invention while FIG. 11 shows very diagrammatically a network system in which a recording apparatus 102' embodying the invention is coupled to a service provider 501 via a network 500 (which may, for example, be the Internet, an intranet, a LAN or a WAN or any combination of these) to enable authentication of a recording medium. The service provider 500 may have a functional form similar to that described above with reference to FIGS. 2 and 3 and is programmed in the manner described above with reference to FIGS. 2 and 3 to provide a service provider profile authenticator 90.

In this embodiment, the expected profile data is not carried by the recording medium 18 but rather is held by the service provider profile authenticator 90. The recording system 100' shown in FIG. 10 therefore differs from that shown in FIG. 1 in that the data provider 200 does not include hidden profile data 5. In addition, the profile authenticator 4 is replaced by a profile authenticator provider 400 and the profile authenticator extractor 26 of the reading apparatus 102 shown in FIG. 1 is replaced by a profile authenticator provider extractor 260.

Respective communications devices 43 of input/output devices 28 of the service provider 501 and the recording apparatus 102' communicate via the network 500 to enable the authentication of a recording medium as will be described below.

The recording apparatus 100' operates in the manner described above with reference to FIG. 4 to 7 and 16 to record the recording data provided by the data provider on the recording medium 18 so that the recorded recording medium carries the content data 3 and the profile authenticator provider 400 and a particular part of the recording medium has a modified DSV characteristic.

The reading apparatus 102' shown in FIG. 10 operates in the same manner as the reading apparatus 102 shown in FIG. 1 except that the profile authenticator provider extractor 260 does not, of course, extract a profile authenticator but extracts the profile authenticator provider 400.

Figure 12:
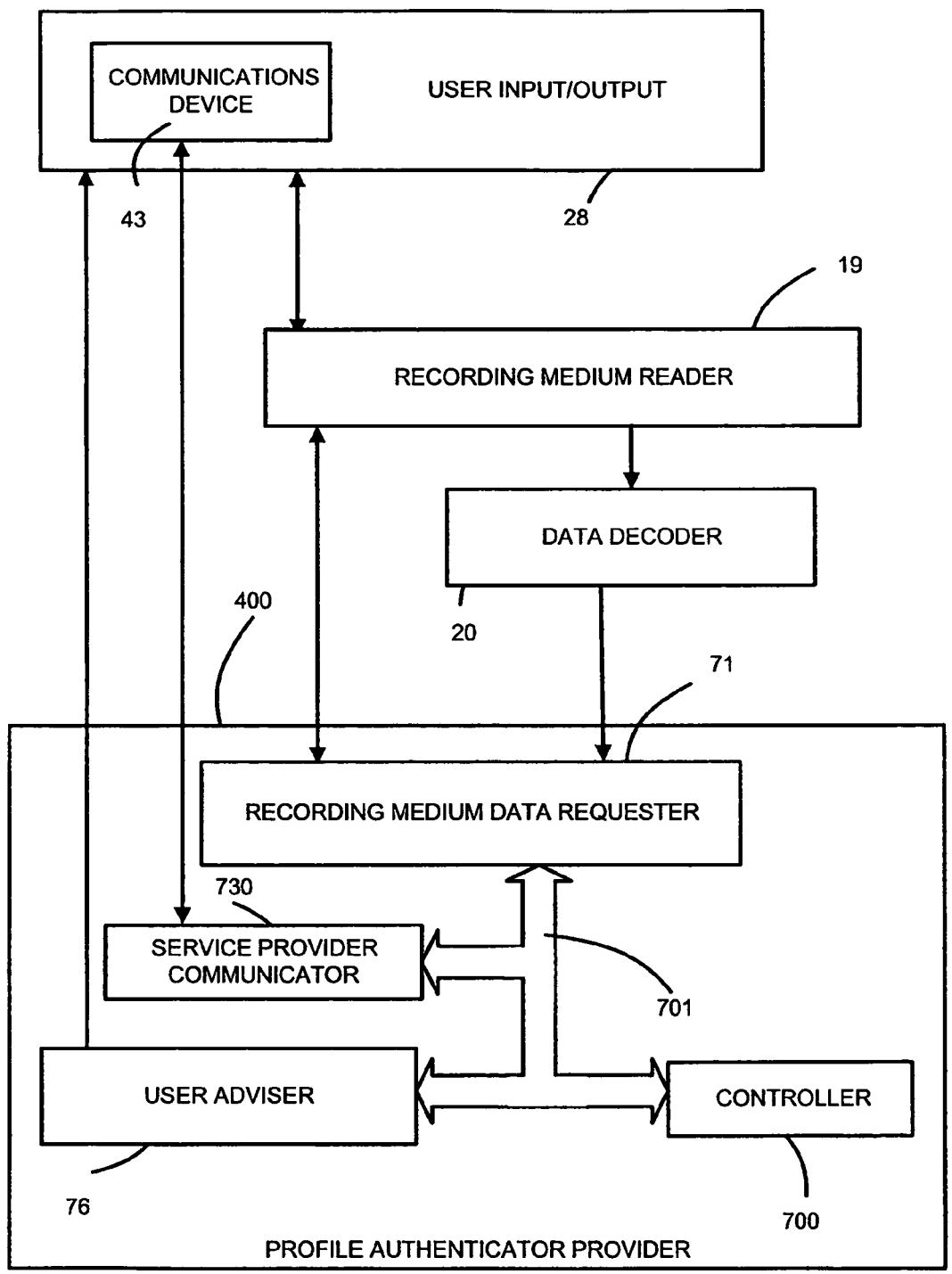
FIG. 12 shows a functional block diagram illustrating functional components of a profile authenticator provider of the reading apparatus shown in FIG. 10.

FIG. 12 shows a block diagram to illustrate the functional components provided by the extracted profile authenticator provider 400. As shown in FIG. 12, the extracted profile authenticated provider 400 comprises a controller 700 which controls overall operation of the profile authenticator provider 400 and a service provider communicator 730 that communicates with the service provider 501 via the communications device 43 of the user input/output 28 of the reading apparatus 102'. Like the profile authenticator shown in FIG. 9*a*, the profile authenticator provider 260 has a recording medium data requester 71 and a user adviser 76 for advising the user of the results of a profile authentication. The functional components of the profile authenticator provider 400 communicate via a bus 701.

The profile authenticator provider 400 shown in FIG. 12 differs from the profile authenticator 4 shown in FIG. 9*a* in that the recording medium data requester 71 operates under instructions from the controller 700 as a result of the communication between the profile authenticator provider 400 and the service provider profile authenticator 90.

Figure 13:
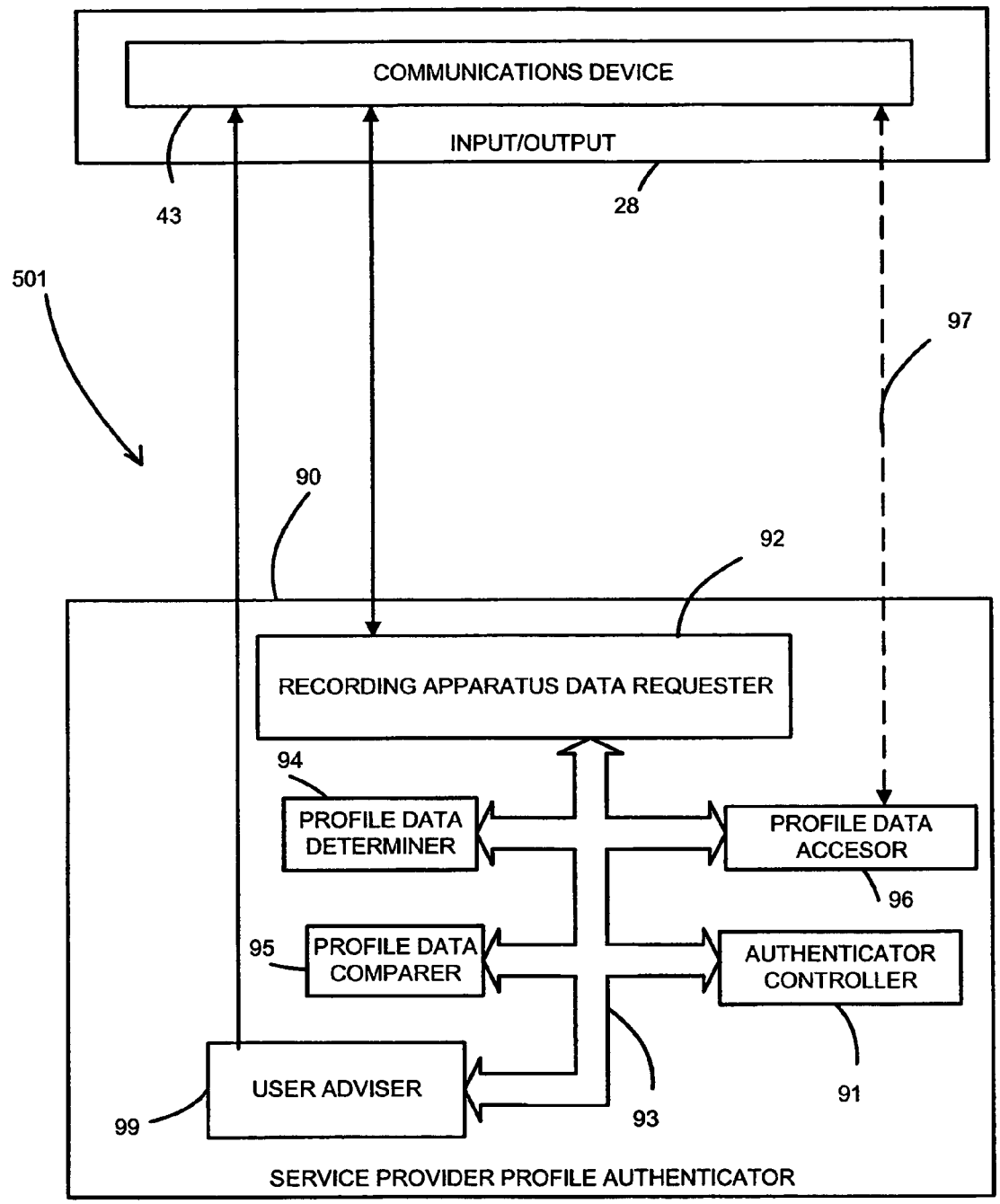
FIG. 13 shows a functional block diagram of a service provider profile authenticator provided by the service provider shown in FIG. 11.

FIG. 13 shows a functional block diagram to illustrate functional components of the service provider profile authenticator 90 provided by the service provider 501. As shown in FIG. 13, the service provider profile authenticator 90 has an authenticator controller 91 for controlling overall operation of the profile authenticator and a recording apparatus data requester 92 for requesting recording data from the recording apparatus 102' via the communications device 43 of the service provider 501.

Like the profile authenticator shown in FIG. 9*a*, the service profile authenticator 90 has a profile data determiner 94 for determining, from data provided from a recording medium 18 via the recording apparatus 102', profile data representing the effect on the operation of a recording medium of a modified DSV characteristic carried by the recording medium and a profile comparer 95 for comparing the determined or derived profile data with expected profile data. In this example, however, the expected profile data is not hidden on the recording medium 18. Rather, the expected profile data is provided by an expected profile accessor 96 which may itself contain the expected profile data or may, as indicated by the dashed line 97 in FIG. 13, access expected profile data from another apparatus coupled to the network 500, for example a dedicated expected profile data store 503 indicated by dashed lines in FIG. 11. The expected profile data is obtained in the manner described above with reference to FIGS. 1 to 9*b*.

Figure 14:
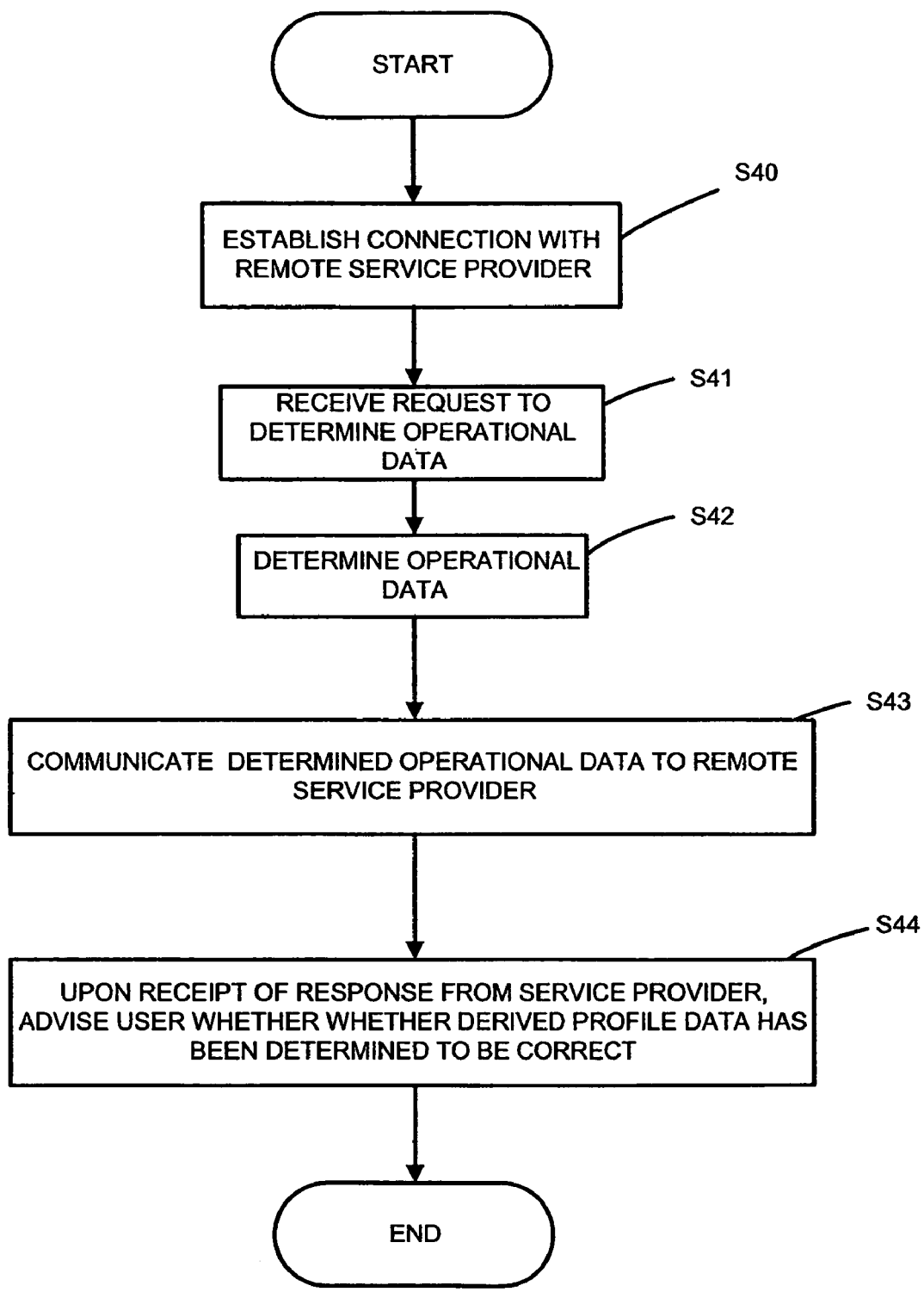
FIG. 14 shows a flowchart illustrating processes carried out by the profile authenticator provider shown in FIG. 12.

Operation of the recording system 100' described with reference to FIGS. 10 to 13 will now be described with the aid of FIGS. 14 and 15. In this example, when the data processor 250 extracts the profile authenticator provider 260, the profile authenticator provider establishes, at S14 FIG. 14, communication with the service provider network communicator 93 of the service provider 501.

Once communication is established, then the authenticator controller 91 of the service provider profile authenticator 90 forwards via the communications device 43 and the network 500, a request to the reading apparatus 102' to read the recording medium 18 to obtain operational data as described above. When, at S41, the profile authenticator provider 400 receives such a request, then at S42, the controller 700 of the profile authenticator provider 400 causes the recording medium data requester 71 to request the recording medium reader 19 to read the recording medium to enable the operational data to be obtained as described above with reference to the embodiment of FIGS. 1 to 9*b*.

At S43 the service provider communicator 730 communicates this operational data to the service provider 501 via the network 500.

Figure 15:
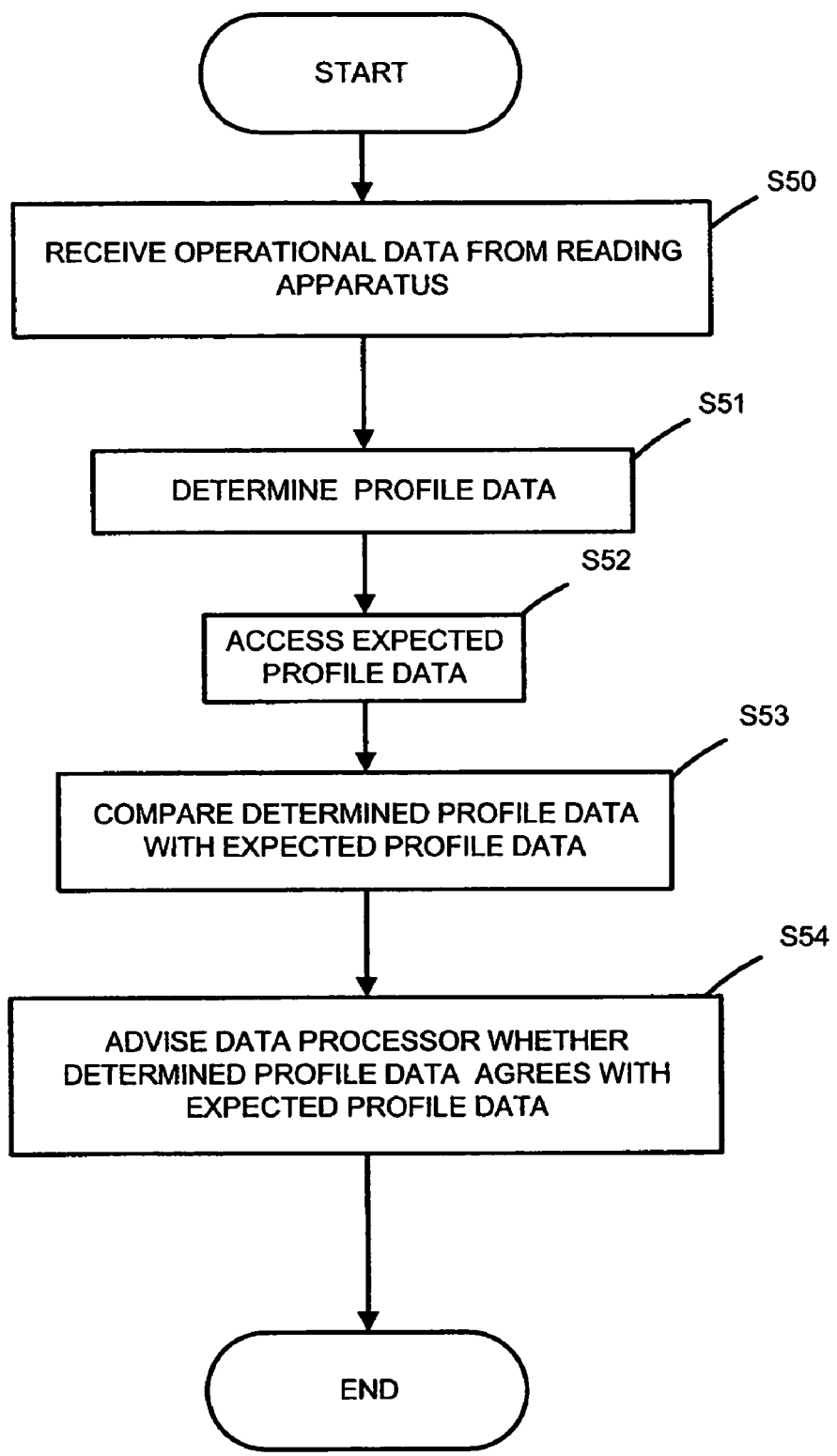
FIG. 15 shows a flowchart illustrating steps carried out by the service provider profile authenticator shown in FIG. 13.

When the recording apparatus data requester 92 of the service provider profile authenticator 90 receives the operational data from the profile authenticator provider 400 via the network 500 at S50 in FIG. 15, then at S51 the profile data determiner 94 determines the profile data from the operational data in the manner described above with reference to FIGS. 9*a* and 9*b*. Once the profile data has been determined, then the profile data comparer 95 communicates with the expected profile accessor 96 under the control of the authenticator controller 91 and compares the derived profile data with the expected profile data at S53 in the manner described above with reference to FIGS. 9*a* and 9*b*.

When the user adviser 99 of the service provider profile authenticator 90 receives the results of the profile comparison from the profile data comparer 95 then, at S54, the service provider 501 communicates with the user adviser 76 of the profile authenticator provider 400 via the network 500 to advise the user whether or not the derived profile data agrees with the expected profile data and the process proceeds as described above with reference to FIGS. 9*a* and 9*b*.

Thus, the system illustrated by FIGS. 10 to 15 differs from that illustrated by FIGS. 1 to 9*b* in that both the derivation of the profile data from the recording medium operational data and the comparison with the expected profile data is carried out remotely of the recording apparatus.

It will, of course, be appreciated that recording systems intermediate the recording systems described above with reference to FIGS. 1 to 9*b* and 10 to 15 may be implemented. Thus, for example, the recording system 100 shown in FIG. 1 may be modified by omitting the hidden profile data and configuring the profile authenticator 26 so that the profile accessor 74 shown in FIG. 9*a* does not communicate with the recording medium reader 19 to obtain the expected profile data but rather communicates with another apparatus to obtain the expected profile data. As another possibility, the reader may obtain the expected profile data from a separate authentication recording medium. As another possibility, instead of communicating the operational data to a service provider, the profile authenticator described above with reference to FIGS. 1 to 9*b* may communicate the determined profile data to the service provider which will then compare the received determined profile data with expected profile data provided by the expected profile accessor 74 shown in FIG. 13, that is the profile data determiner 94 may be present in the profile authenticator provider 260 rather than the service provider profile authenticator 90.

Once the authenticity or not of the recording medium has been established, the content data extractor may proceed to extract content from a recording medium under instructions supplied by the user via the input/output 28 of the data processor 25 or 250 in the normal manner. The profile authenticator or profile authenticator provider may be configured to enable the content data extractor 27 only to extract content data from the recording medium if the modified DSV characteristic or watermark is present. As another possibility, the profile authenticator or profile authenticator provider may be configured simply to alert the user to the fact that the recording medium is not authentic but still allow the user to read the recording medium.

In the above described embodiments, the recording medium is an optical disc. It will, of course, be appreciated that the present invention may be applied to other forms of digital recording media such as, for example, magnetic or magneto-optical recording media. In addition, in the above described embodiments, the recording media is a disc that is read by spinning or rotating the disc about a central axis. It may, however, also be possible to apply the present invention to digital recording media in the form of tape which is transported along a path past, rather than rotated with respect to, a read/write head.

As described above, the operational data is determined by, for example, determining the time to access frames on the recording medium. As another possibility, where the recording medium reader has a shaft encoder or other transducer for determining the speed of rotation or transport of the recording medium, the output of this encoder or transducer may be used to determine the operational data.

It will of course be appreciated that the methods described above for encoding the data for recording are only examples ad that any encoding format may be used, provided that the encoding process can be modified to enable part of the encoded data to provide the recording medium with a modified characteristic as described above that may be used as authentication data to enable the authenticity of the recording medium to be checked.

What is claimed is:

1. Apparatus for recording data on a recording medium, the apparatus comprising:
a data provider operable to provide recording data to be recorded on the recording medium;
a data encoder operable to encode the recording data so as to produce encoded data; and
a recorder operable to record the encoded data on the recording medium,
wherein the data encoder is operable to modify the encoding of part of the recording data so that part of the encoded data has a modified characteristic that causes a servo tracking system of an apparatus reading the recorded recording medium to lose track and wherein the data encoder also includes in the encoded data recorded on the recording medium expected profile data which is operational data resulting from the modified characteristic which extends over at least 56 frames of data and wherein the recording medium is subject to authentication by comparing the expected profile data to the modified characteristic obtained when the recording medium is played.

2. Apparatus according to claim 1, wherein the data encoder is operable to encode the recording data so that the modified characteristic is a DC characteristic.

3. Apparatus according to claim 1, wherein the data encoder is operable to encode successive data sets as corresponding codes and is operable to select the code for a data set so as normally to maintain a digital sum value for the encoded data of about zero, the data encoder being operable to produce the modified characteristic by selecting for data sets in the said part of the recording data codes that cause the digital sum value for the part to increase from about zero to at least an absolute value of 1,120 and then to decrease again to about zero.

4. Apparatus according to claim 1, wherein the data is to be recorded as frames of data sets, the part comprises a successive set of frames and the data encoder is operable to select data codes that cause a digital sum value to increase from about zero to a value in the range of absolute values from 1,120 to 2,240 and then to decrease again to about zero within the successive set of frames.

5. Apparatus according to claim 4, wherein the number of frames in the successive set of frames is at least 56.

6. Apparatus for use in determining the authenticity of a recorded recording medium, the apparatus comprising:
a profile data provider operable to determine profile data derived from operational data which extends over at least 56 frames of data and is from playing a recording medium;
an expected profile data accessor operable to access expected profile data provided on the recording medium and representing expected operational data on the recording medium wherein the operational data indicates a servo tracking system of the apparatus has lost track;
a comparer operable to compare the determined profile data with the expected profile data; and
an advisor operable to advise whether the recording medium is authentic according to the comparison by the comparer wherein the recording medium is subject to authentication by comparing the expected profile data to the modified characteristic obtained when the recording medium is played.

7. Apparatus according to claim 6, wherein the profile data provider comprises:
an operational data determiner operable to determine the operational data relating to an operational characteristic of the recording medium; and
a profile data determiner operable to determine the profile data from the determined operational data.

8. Apparatus according to claim 7, wherein the operational data determiner is operable to determine the loss of track from a speed of operation of the recording medium.

9. Apparatus according to claim 7, wherein the operational data determiner is operable to determine the loss of track from at least one of an access time, a seek time and a transfer time of the recording medium.

10. Apparatus according to claim 7, wherein the profile data determiner is operable to determine the loss of track from at least one of an access time, a seek time and a transfer time of the recording medium.

11. Apparatus according to claim 6, wherein the profile data provider comprises a communicator operable to communicate with a recording medium reading apparatus to receive from the reading apparatus operational data for the recording medium, and a profile data determiner operable to determine profile data derived from received operational data.

12. A recorded recording medium carrying encoded recording data including a watermark provided by a part of the encoded recording data which has an encoding characteristic that causes a servo tracking system of an apparatus reading the recorded recording medium to lose track during a recording medium reading operation; wherein the encoded data further includes expected profile data of operational data of the recording medium resulting from the encoding characteristic which extends over at least 56 frames of data and wherein the recording medium is subject to authentication by comparing the expected profile data to the encoding characteristic obtained when the recording medium is played.

13. A recorded recording medium according to claim 12, wherein the expected profile data is hidden.

14. A recorded recording medium according to claim 12, wherein the encoded recording data includes a profile data authenticator enabling the comparison.

15. A recorded recording medium according to claim 12, wherein the expected profile data is hidden and the encoded recording data includes a profile data authenticator for enabling the comparison.

16. A recorded recording medium according to claim 12, wherein the encoding characteristic is a modified DC characteristic for that part of the recording data.

17. A recorded recording medium according to claim 12, wherein the encoding characteristic is a variation in the digital sum value that extends over a successive set of frames on the recording medium of at least 56 frames and peaks in a range of at least an absolute value of 1,120.

18. A method of recording data on a recording medium, the method comprising:
  encoding the recording data so as to produce encoded data so that part of the encoded data has a modified characteristic which is a digital sum value of at least an absolute value of 1,120 and that causes a servo tracking system of an apparatus reading the recorded recording medium to lose track;
  determining expected profile data representing the modified characteristic; and
  recording the encoded data and the expected profile data on the recording medium wherein the recording medium is subject to authentication by comparing the expected profile data to the modified characteristic obtained when the recording medium is played.

19. A method according to claim 18, wherein successive data sets are encoded as corresponding code, the code for a data set is selected so as normally to maintain a digital sum value for the encoded data at or close to zero, but the code for data sets in the said part of the recording data codes are selected to cause the digital sum value to change to produce the modified characteristic.

20. A method according to claim 18, wherein the codes for data sets in the said part of the recording data codes are selected to cause the digital sum value to increase from about zero to at least an absolute value of 1,120 and then to decrease again to about zero.

21. A storage medium storing program instructions for programming a processor to carry out a method in accordance with claim 18.

22. Apparatus according to claim 1, wherein the part defines a well-defined peak in digital sum value.

23. A recorded recording medium according to claim 12, wherein the encoding characteristic defines a well-defined peak in digital sum value.

24. A recorded recording medium carrying encoded recording data including a watermark provided by a part of the encoded recording data which has an encoding characteristic that causes a servo tracking system of an apparatus reading the recorded recording medium to lose track during a recording medium reading operation; wherein the encoded data further includes expected profile data of operational data of the recording medium resulting from the encoding characteristic wherein the recording medium is subject to authentication by comparing the expected profile data to the encoding characteristic obtained when the recording medium is played, wherein the encoding characteristic is a digital sum value of at least an absolute value of 1,120.

25. A method for determining authenticity of a recorded recording medium having data recorded thereon, comprising:
  playing the recorded recording medium on a reading apparatus;
  determining a presence in the recorded data of a modified operational characteristic which extends over at least 56 frames of data and that indicates a servo tracking system of the reading apparatus has lost track;
  determining a presence in the recorded data of expected profile data representing the modified operational characteristic;
  comparing a profile of the modified operational characteristic to the expected profile data; and
  if the comparison is successful, authenticating the recorded recording medium wherein the recording medium is subject to authentication by comparing the expected profile data to the modified characteristic obtained when the recording medium is played.

26. Apparatus for recording data on a recording medium, the apparatus comprising:
  a data provider operable to provide recording data to be recorded on the recording medium;
  a data encoder operable to encode the recording data so as to produce encoded data; and
  a recorder operable to record the encoded data on the recording medium,
  wherein the data encoder is operable to modify the encoding of part of the recording data so that part of the encoded data has a modified characteristic that causes a servo tracking system of an apparatus reading the recorded recording medium to lose track and wherein the data encoder also includes in the encoded data recorded on the recording medium expected profile data which is operational data resulting from the modified characteristic which is a digital sum value of at least an absolute value of 1,120, and wherein the recording medium is subject to authentication by comparing the expected profile data to the modified characteristic obtained when the recording medium is played.

27. Apparatus for use in determining the authenticity of a recorded recording medium, the apparatus comprising:
  a profile data provider operable to determine profile data derived from operational data which is an indication of a digital sum value of at least and absolute value of 1,120 and is from playing a recording medium;
  an expected profile data accessor operable to access expected profile data provided on the recording medium and representing expected operational data on the recording medium wherein the operational data indicates a servo tracking system of the apparatus has lost track;
  a comparer operable to compare the determined profile data with the expected profile data; and
  an advisor operable to advise whether the recording medium is authentic according to the comparison by the comparer wherein the recording medium is subject to authentication by comparing the expected profile data to the modified characteristic obtained when the recording medium is played.

28. A method of recording data on a recording medium, the method comprising:

encoding the recording data so as to produce encoded data so that that part of the encoded data has a modified characteristic which extends over at least 56 frames of data and that causes a servo tracking system of an apparatus reading the recorded recording medium to lose track;

determining expected profile data representing the modified characteristic; and recording the encoded data and the expected profile data on the recording medium wherein the recording medium is subject to authentication by comparing the expected profile data to the modified characteristic obtained when the recording medium is played.

29. A method for determining authenticity of a recorded recording medium having data recorded thereon, comprising:

playing the recorded recording medium on a reading apparatus;

determining a presence in the recorded data of a modified operational characteristic which is an indication of a digital sum value of at least an absolute value of 1,120 and that indicates a servo tracking system of the reading apparatus has lost track;

determining a presence in the recorded data of expected profile data representing the modified operational characteristic;

comparing a profile of the modified operational characteristic to the expected profile data; and if the comparison is successful, authenticating the recorded recording medium wherein the recording medium is subject to authentication by comparing the expected profile data to the modified characteristic obtained when the recording medium is played.

\* \* \* \* \*